(12) United States Patent
Zeine et al.

(10) Patent No.: US 11,670,969 B2
(45) Date of Patent: Jun. 6, 2023

(54) WIRELESS POWER TRANSMISSION SYSTEM CAPABLE OF CHANGING POWER TRANSMISSION FREQUENCY

(71) Applicant: Ossia Inc., Redmond, WA (US)

(72) Inventors: Hatem Ibrahim Munir Zeine, Woodinville, WA (US); Alireza Pourghorban Saghati, Redmond, WA (US)

(73) Assignee: Ossia Inc., Redmond, WA (US)

( * ) Notice: Subject to any disclaimer, the term of this patent is extended or adjusted under 35 U.S.C. 154(b) by 102 days.

(21) Appl. No.: 16/740,080

(22) Filed: Jan. 10, 2020

(65) Prior Publication Data
US 2020/0235611 A1    Jul. 23, 2020

Related U.S. Application Data

(60) Provisional application No. 62/794,553, filed on Jan. 18, 2019.

(51) Int. Cl.
| | | |
|---|---|---|
| *H02J 50/20* | (2016.01) | |
| *H02J 7/02* | (2016.01) | |
| *H02J 50/40* | (2016.01) | |
| *H02J 50/80* | (2016.01) | |

(52) U.S. Cl.
CPC ............ *H02J 50/20* (2016.02); *H02J 7/02* (2013.01); *H02J 50/402* (2020.01); *H02J 50/80* (2016.02)

(58) Field of Classification Search
CPC .... H02J 50/12; H02J 50/20; H02J 7/02; H02J 50/80
See application file for complete search history.

(56) References Cited

U.S. PATENT DOCUMENTS

| | | | |
|---|---|---|---|
| 9,756,544 B2 | 9/2017 | Ananthanarayanan et al. | |
| 9,825,674 B1 * | 11/2017 | Leabman | H04B 5/0037 |
| 9,853,458 B1 | 12/2017 | Bell et al. | |
| 10,248,899 B2 * | 4/2019 | Kesler | H02J 50/60 |
| 2007/0066311 A1 * | 3/2007 | Reibel | H04W 52/0261 |
| | | | 455/445 |
| 2011/0151789 A1 * | 6/2011 | Viglione | H02J 50/23 |
| | | | 455/42 |
| 2013/0193918 A1 * | 8/2013 | Sarkar | B60L 53/53 |
| | | | 320/109 |
| 2015/0229133 A1 * | 8/2015 | Reynolds | H02J 7/0048 |
| | | | 307/24 |

(Continued)

FOREIGN PATENT DOCUMENTS

| | | | | |
|---|---|---|---|---|
| WO | 2017160723 | | 9/2017 | |
| WO | WO-2019141782 A1 * | | 7/2019 | A61B 5/0028 |

OTHER PUBLICATIONS

International Search Report and Written Opinion dated Mar. 30, 2020 for PCT Application No. PCT/US2020/013401, 13 pages.

*Primary Examiner* — Richard V Muralidar
(74) *Attorney, Agent, or Firm* — Amin, Turocy & Watson, LLP

(57) ABSTRACT

Various wireless power systems are described that are capable of changing a transmit frequency employed by antennae, or groups of antennae, of the wireless power system, e.g., adjusting a current transmit frequency to a new transmit frequency within an operable frequency range, or switching among different transmit frequencies to increase a transmission characteristic of the wireless power system.

20 Claims, 14 Drawing Sheets

(56) References Cited

U.S. PATENT DOCUMENTS

| | | | |
|---|---|---|---|
| 2015/0349542 A1* | 12/2015 | Yamamoto | H02J 50/40 |
| | | | 307/104 |
| 2016/0197522 A1* | 7/2016 | Zeine | H02J 50/70 |
| | | | 307/104 |
| 2017/0237296 A1* | 8/2017 | Keith | H02J 7/045 |
| | | | 307/104 |
| 2017/0358950 A1 | 12/2017 | Zeine et al. | |
| 2018/0278099 A1* | 9/2018 | Hong | H04B 5/0037 |
| 2018/0287431 A1* | 10/2018 | Liu | H02J 50/20 |
| 2018/0331581 A1* | 11/2018 | Hosseini | H02J 7/0042 |
| 2021/0059526 A1* | 3/2021 | Khaleghi | A61B 5/0031 |

* cited by examiner

WIRELESS POWER TRANSMISSION SYSTEM CAPABLE OF CHANGING POWER TRANSMISSION FREQUENCY

RELATED APPLICATION

The subject patent application claims priority to U.S. Provisional Patent Application No. 62/794,553, filed Jan. 18, 2019 and entitled "WIRELESS POWER TRANSMISSION SYSTEM CAPABLE OF CHANGING POWER TRANSMISSION FREQUENCY," the entirety of which application is hereby incorporated by reference herein.

TECHNICAL FIELD

The subject disclosure generally relates to embodiments corresponding to a wireless power system capable of changing a transmit frequency employed by antennae, or groups of antennae, of the wireless power system, e.g., adjusting a current transmit frequency to a new transmit frequency within an operable frequency range, or switching among different transmit frequencies to increase a transmission characteristic of the wireless power system.

BACKGROUND

Conventional wireless power transmission systems can wirelessly deliver power to devices. However, it has been prohibitively burdensome and expensive for conventional power transmission technologies to transmit power via radio frequency (RF) means as such transmission requires use of many antenna, which can lead to runaway costs. Consequently, conventional wireless power transmission technologies have had some drawbacks, such as being limited to a static transmit frequency of fixed transmit hardware, and some of which may be further noted with reference to the various embodiments described herein below.

BRIEF DESCRIPTION OF THE DRAWINGS

Non-limiting embodiments of the subject disclosure are described with reference to the following figures, wherein like reference numerals refer to like parts throughout the various views unless otherwise specified.

DETAILED DESCRIPTION

Figure 1:
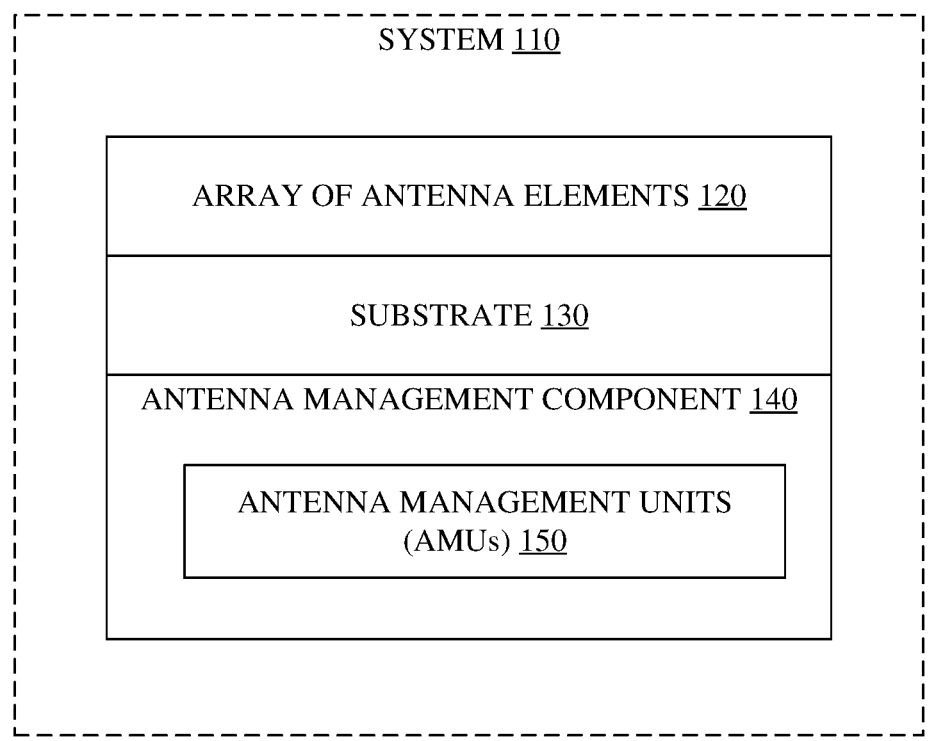
FIG. 1 illustrates a block diagram of a system that facilitates wireless delivery of power to a power storage element of a wireless device, in accordance with various example embodiments.

Aspects of the subject disclosure will now be described more fully hereinafter with reference to the accompanying drawings in which example embodiments are shown. In the following description, for purposes of explanation, numerous specific details are set forth in order to provide a thorough understanding of the various embodiments. However, the subject disclosure may be embodied in many different forms and should not be construed as limited to the example embodiments set forth herein.

Conventional wireless power transmission technologies have had some drawbacks with respect to using many antennas to deliver power wirelessly to a device, since, among other things, such complexity adds to costs, and thus conventionally, such systems have been limited to a single operating frequency of the antennas that send power transmission signals. In contrast, various embodiments disclosed herein can vary a power transmission frequency of one or more antenna elements configured to transmit within a range of frequencies by adjusting one or more transmit parameters of the one or more antenna elements. Alternatively, with a group of antennae that are pre-configured to transmit at different frequencies or different ranges of frequencies, various embodiments herein can vary a transmit frequency of one or more antennae of a group of antennae, or switch between, or combine different subsets of, antennae of a group of antennae that are pre-configured to transmit at different frequencies. The latter case can be combined with the former as well in that the different groups of antennae can be pre-configured to variably transmit within respective different ranges, with each group of the groups being adjustable to transmit power signals within its respective frequency range, and the system can switch between and within the respective frequency ranges to improve a current power charging dynamic of a charging receiver.

In this regard, various embodiments herein relate generally to a wireless power system capable of switching to an improved or optimum frequency for the delivery of power signals to a power receiver, e.g., a frequency reconfigurable wireless charger device that adapts to a changing environment in which it is positioned, or adapts to changing conditions within a fixed environment to improve the delivery of power to a receiver element.

For instance, in different environments and under different conditions, there might be an optimum frequency at which power delivery becomes the most efficient, or at least clearly more efficient than a current frequency, and thus, if an antenna element or group of antenna elements can deliver within a range of frequencies for delivering power signals to a receiver element, it may be that frequencies at the higher end of the range result in superior delivery of power to the receiver element according to one or more criterion, such as signal reliability, charging speed, power of received signals, reduced noise or interference, etc. Similarly, if a power transmitter apparatus comprises multiple different antennae or different groups of antennae that respectively transmit according to different frequencies, then similarly, it may be that a group of antenna elements that deliver power at 100 GHz is way more efficient than a different group of antenna elements that deliver power at 10 GHz, and thus, the power transmitter apparatus can switch to the 100 GHz power transmit frequency, or remain at the 10 GHz frequency, e.g., depending on feedback about charging efficacy that the power transmitter receives with respect to remaining at 10 GHz, or switching to 100 GHz.

Further, in another embodiment, a series of resonating elements, e.g., a group of antennae, can be driven together or individually to achieve different frequencies of power transmission signals. For instance, from a design standpoint, it may be that an antenna that operates at 2.4 GHz involves more circuitry than a corresponding antenna on the market that operates at a higher frequency, such as 5.8 GHz. Thus, instead of providing an array of antenna elements in the power transmitter, including a first group of antennae operating at 2.4 GHz (high cost) that are each driven individually at 2.4 GHz and a second group of antennae operating at 5.8 GHz (low cost) that are each driven individually at 5.8 GHz, and switching between the groups to determine a best effective group of antennae to power with which to power a receiver, the first group of antenna and/or the second group of other antennae can be driven/resonated together to achieve a different aperture and frequency of transmission than the individual frequencies. For instance, the second group of 5.8 GHz antennae, when driven together (resonated differently in different modes), causes the second group of 5.8 GHz antennae to emit at a different effective frequency, such as 2.4 GHz, thereby achieving the 2.4 GHz frequency without the high cost hardware.

In this regard, as one example embodiment for switching frequencies for an array of antennae and a client that are in a feedback loop is to implement a process by which different frequencies are tried intelligently. Ultimately, a frequency is chosen based on an analysis of any one or more of 1) historical feedback about which frequencies power receiver elements best under similar conditions, 2) present feedback about a current frequency used by the power transmitter about how well the receiver element is receiving power, 3) a predicted behavior of the receiver element (e.g., if the receiver element is moving toward a corner of the room), i.e., factors that affect power transmission and/or reception. As a result of the analysis, power delivery will continue at a best or near best frequency, or frequencies of different antennae, using the available power transmitter antennae and their respective frequencies or range of frequencies—wherever the process dictates performance increases can be realized with a frequency switch of a one or more antennae.

The analysis can be designed in such a way that, unless the client moves or the conditions in the environment changes, the frequency can remain the same. In this regard, once the process selects a new optimal, or near optimal, frequency or set of frequencies for the current conditions, unnecessary evaluation of feedback by the power transmitter and unnecessary sending and computation of feedback by the receiver element can be substantially reduced or avoided. Once a condition changes, the analysis can be conducted again. For instance, once the phase set on a beacon signal is changed as received from the charging element, the charger understands that conditions have changed and will run the frequency search algorithm again. Likely, the receiver element has moved, and/or other objects in the environment have moved, thereby creating new conditions in the environment for evaluation of frequency adjustment.

In an optional embodiment, the selection of the optimum (or near optimum) frequency can happen in two steps. First, a coarse search can happen, and the best band can be selected. Once the correct frequency band is selected, the second step would be a fine search within the best band to select the best channel.

In one embodiment, an array of antennae are employed that operate over an ultra wide band range, and correspondingly, the charging client is capable of performing over the same range.

In another embodiment, a wireless power transfer (WPT) system can operate using at least two different frequency bands, overlapping or non-overlapping. Then, by having a wider effective BW for the antennas and passives over those at least two bands of operation, fine tuning can happen that results in the best possible frequency for the environment and conditions on hand.

With regard to such a wide band system, each of the operational parts of the system are also designed to be compatible with the wide band system (either the UWB system or a dual/triple band system). In such case, the antennas are designed to cover the entire bandwidth of the frequency bands that are employed.

Based on different paths, a signal transmitted from a single antenna travels at different frequencies, and, as a result, a multi-path effect might result in either fading (destructive interference) or constructive interference of the signal and its reflected versions. If the frequency is selected correctly, this interference is going to be constructive which results in a more efficient power delivery system.

In addition to leveraging the possibility of constructive interference, a loss of energy due to reflections can be avoided by using such a system. For instance, a wireless power transmission system uses different antennas to find the best possible path for power delivery, but this path can be more efficient for some frequencies than other frequencies. Based on the distance of the client from the charger, environment and how reflective signals are at different frequencies, etc. this optimum frequency changes. As a result, having a floating frequency for power delivery is beneficial to users who want seamless, efficacious charging of their clients.

In an example embodiment, a wireless power delivery system comprises an array of antenna elements positioned on a surface of a substrate, wherein a first antenna element of the array of antenna elements transmits power at a first frequency and a second antenna element of the array of antenna elements transmits power at a second frequency, different than the first frequency. The wireless power delivery system further comprises an antenna management component that receives, via the array of antenna elements, respective portions of a wireless signal that has been transmitted by a wireless charging device, and, based on characteristics of the respective portions of the wireless signal measured by respective antenna elements of the array of antenna elements, determines a change in condition has manifested according to a defined change criterion that triggers an analysis of whether to switch at least one of the first antenna element or the second antenna element on or off to change a frequency emitted by the wireless power delivery system to the wireless charging device, resulting in a modified frequency. Further, in response to determining that at least one of the first antenna element or the second antenna element is to switch on or off, the antenna management component switches on or off the at least one of the first antenna element or the second antenna element and delivers the power according to the modified frequency, as a result of which a charging performance of the wireless charging device is increased.

With regard to the analysis, the analysis can comprise receiving feedback from the wireless charging device relating to the charging performance experienced by the wireless charging device when receiving the power according to the first frequency relative to when receiving the power according to the second frequency. Alternatively, the analysis can comprise receiving feedback from the wireless charging device relating to a strength of the power received by the wireless charging device. As another option, the analysis can comprise receiving feedback from the wireless charging device relating to a reliability of the power received by the wireless charging device. Further, the analysis can comprise receiving feedback from the wireless charging device relating to a constructive interference measured for the power received by the wireless charging device.

Still further, the analysis can comprise any one or more of the analysis of historical feedback previously received about which of at least one of the first frequency or the second frequency is likely to best deliver power for the change in the condition, the analysis of present feedback from the wireless charging device about how well the wireless charging device is currently receiving the power according to the at least one of the first frequency or the second frequency, or the analysis of a predicted behavior of the wireless charging device, such as a predicted movement of the wireless charging device.

In another embodiment, a wireless power delivery system comprises an array of antenna elements positioned on a surface of a substrate, wherein a first antenna element of the array of antenna elements transmits power within a first frequency range and a second antenna element of the array of antenna elements transmits power within a second frequency range. The wireless power delivery system further comprises an antenna management component that receives, via the array of antenna elements, respective portions of a wireless signal that has been transmitted by a wireless charging device, and, based on characteristics of the respective portions of the wireless signal measured by respective antenna elements of the array of antenna elements, the antenna management component further determines, according to a defined change criterion, that a condition of an environment in which the wireless power delivery system and the wireless charging device are situated has changed. Such determination that the condition has changed initiates an analysis of whether to change at least one of a first operating frequency in the first frequency range of the first antenna element to a modified first operating frequency within the first frequency range or a second operating frequency in the second frequency range of the second antenna element to a modified second operating frequency within the second frequency range.

Further, in response to determining that the at least one of the first operating frequency or the second operating frequency is to change, the antenna management component changes the at least one of the first operating frequency or the second operating frequency to deliver the power according to the at least one of the modified first operating frequency or the modified second operating frequency, as a result of which a charging performance the wireless charging device is increased. In this embodiment, the first and second frequency ranges can be the same or different, or some of the frequency ranges can be the same or common across different antenna elements, while other antenna elements can operate according to different ranges.

As an example, non-limiting frequency range, at least one of the first frequency range or the second frequency range can comprise an ultra wide band range of frequencies. In one embodiment, the wireless charging device is also configured to receive power according to the ultra wide band range of frequencies.

In this regard, and now referring to FIG. 1, a block diagram (100) of a system (110) that facilitates delivery of power to a power storage element of a wireless device (e.g., 802a, 802b, 802n of FIG. 8) is illustrated. As shown, system (110) comprises a substrate (130) that can be tile-like, an array of antenna elements (120) and an antenna management component (140) comprising AMUs (150), which facilitate management of switching of antenna operating frequencies as described herein. Optionally, the array of antenna elements (120) can be positioned on a surface of a substrate (130), e.g., flat panel substrate, or a tile-like substrate, e.g., a tile-like flat panel substrate.

Figure 2:
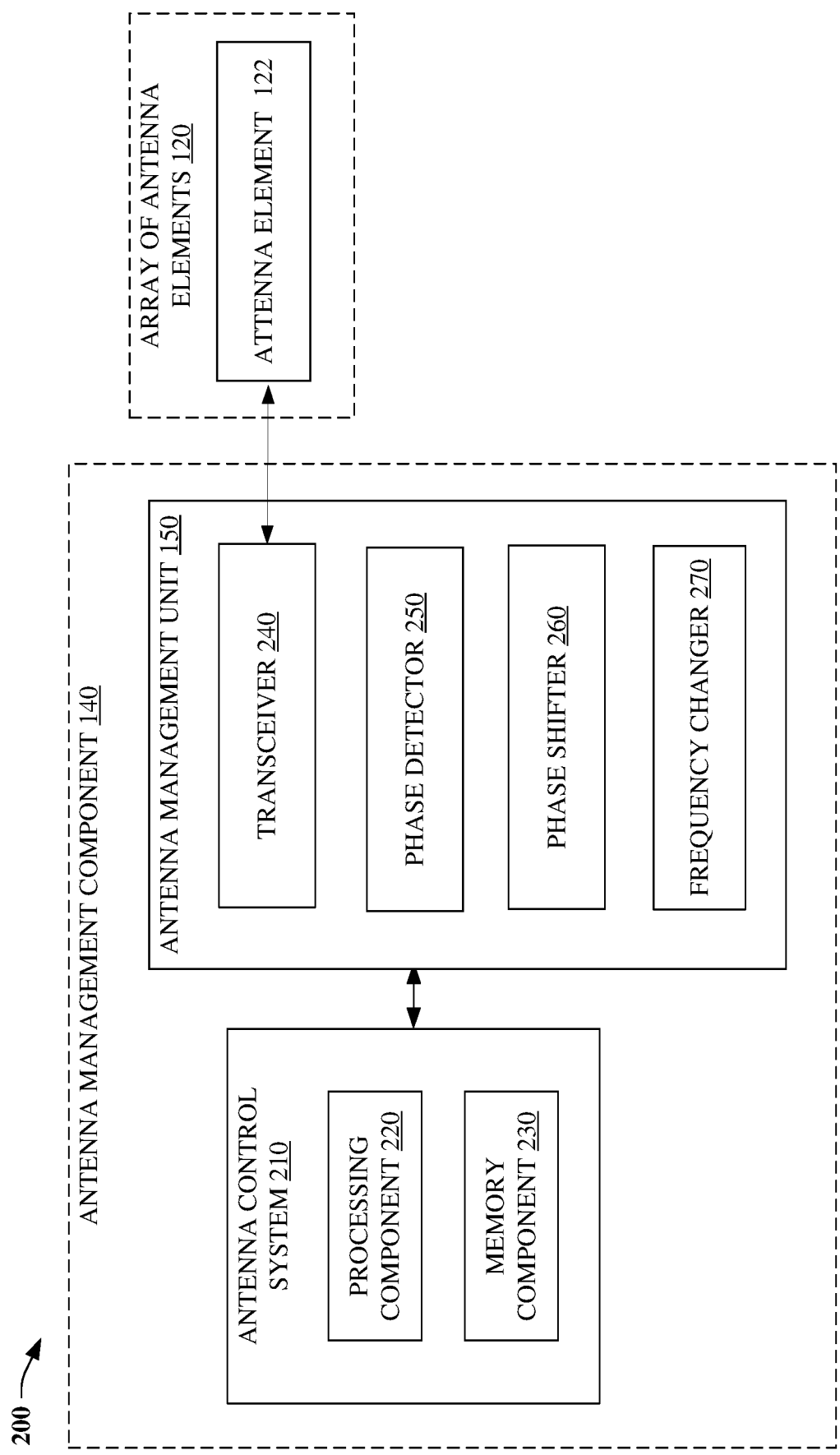
FIG. 2 illustrates a block diagram of an antenna management component comprising an antenna control system that is communicatively coupled to an antenna management unit (AMU) to facilitate wireless delivery of power to a receiving device, with adjustable power transmission frequency, in accordance with various example embodiments.

FIG. 2 illustrates a block diagram (200) of an antenna management component (140) comprising an antenna control system (210) that is communicatively coupled to an AMU (150) to facilitate the delivery of power to the storage element of the wireless device, respectively, using variable frequency transmit strategies, in accordance with various example embodiments. AMUs (150) can be positioned on a same surface of substrate (130) on which the array of antenna elements (120) is positioned, or on an opposite surface. Antenna control system (210) can comprise a processing component (220) and a memory component (230) that facilitate determination of instructions for the AMUs (150) with respect to frequency to use to transmit power.

In embodiment(s), each AMU (150) can be connected, by way of respective vias within the flat panel substrate (130), to respective antenna elements (e.g., 122) of the array of antenna elements (120), in order to respectively control operating frequencies thereof. One or more AMUs (150) can be connected to an antenna element 122 of the array of antenna elements to control transmission at different frequencies. In other embodiment(s), traces, e.g., conductive traces, etc. formed on the flat panel substrate can communicatively couple one or more AMUs to one or more antenna elements, to facilitate the effectuation of variably power transmission frequencies.

As an example, an AMU (150) can comprise a transceiver (240) for communications to or from the respective antenna element (122). In addition, AMU (150) can comprise a phase detector (250) that determines a phase of the portion and an amplitude of the portion, and a phase shifter (260) that generates a modified phase based on the phase, which facilitate determining whether a change in condition in the power charging environment has manifested, since if substantial changes in phase are detected in signals received from the charging client are detected, this is evidence that such a change in condition has occurred. And, if a change has occurred that merits a change in operating frequency of one or more antennae of the wireless charger device, the frequency changer (270) can operate to perform such change. In addition, where different antennas operate at different fixed frequencies, the frequency changer (270) can operate to cycle through on and off permutations and combinations of the different fixed frequencies of the antennae in reaching a determination of an optimum performance for power charging has been reached (or at least a "good enough" threshold performance has been reached to cease cycling for the time being), until the condition in the environment has been determined to have changed again.

Figure 3:
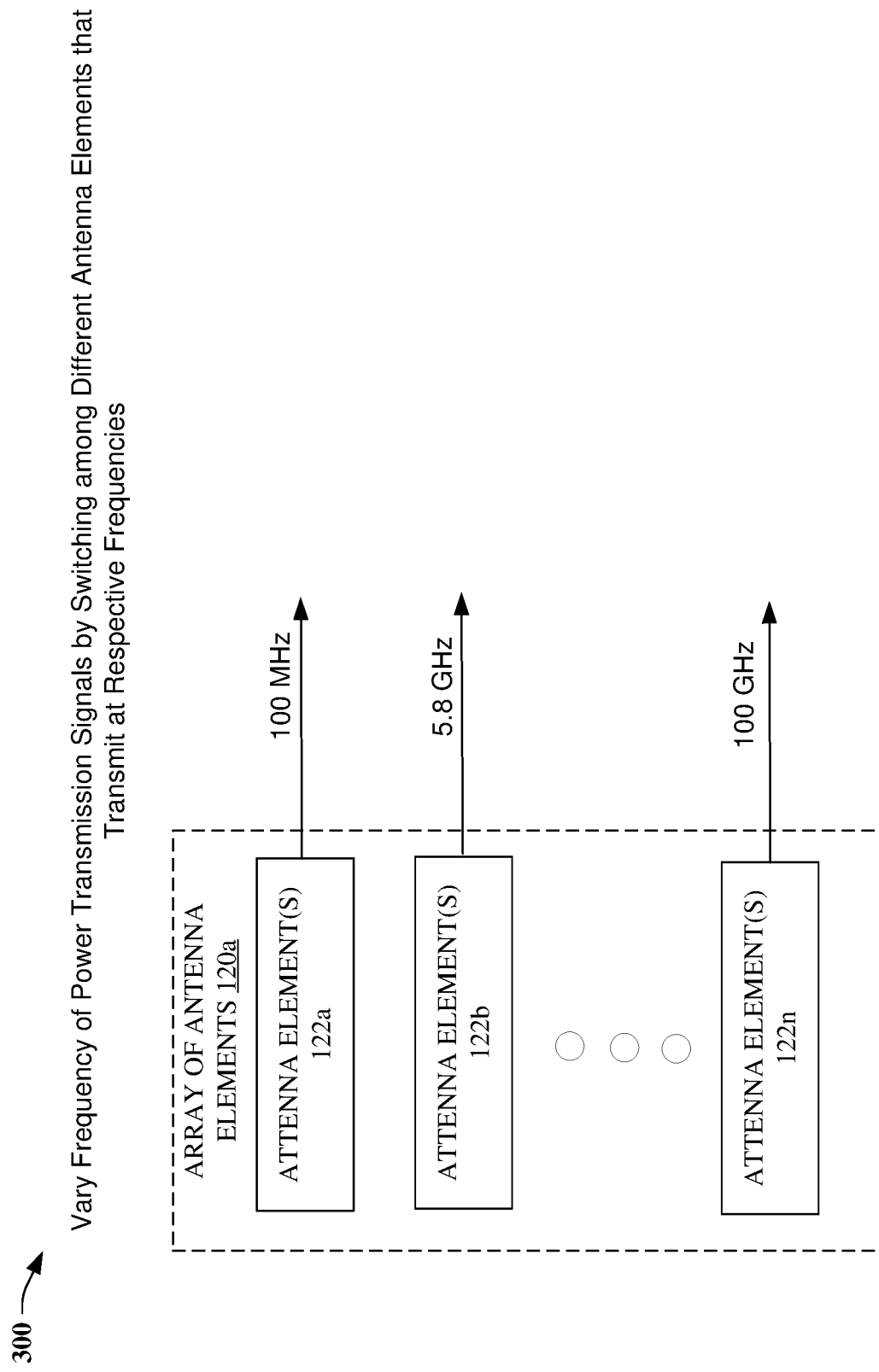
FIG. 3 illustrates a block diagram illustrating, via an array of antenna elements that adjustably transmit according to different power transmission frequencies, wireless delivery of power to a power storage element of a wireless device, in accordance with various example embodiments.

In an example embodiment of the present application illustrated in FIG. 3, a system 300 comprises an array of antenna elements 120a, including antenna element(s) 122a (one antenna or a group), 122b, . . . , 122n, which respectively transmit at different frequencies, e.g., 100 MHz, 5.8 GHz, . . . , 100 GHz (i.e., any frequencies with which antennas can be used to transmit power). When conditions trigger the frequency analysis by the antenna management component (140), the antenna management component (140) determines which antenna element(s) 122a, 122b, . . . , 122n are contributing to a best (or 'good enough') power delivery package possible for the current conditions of the charging element.

Figure 4:
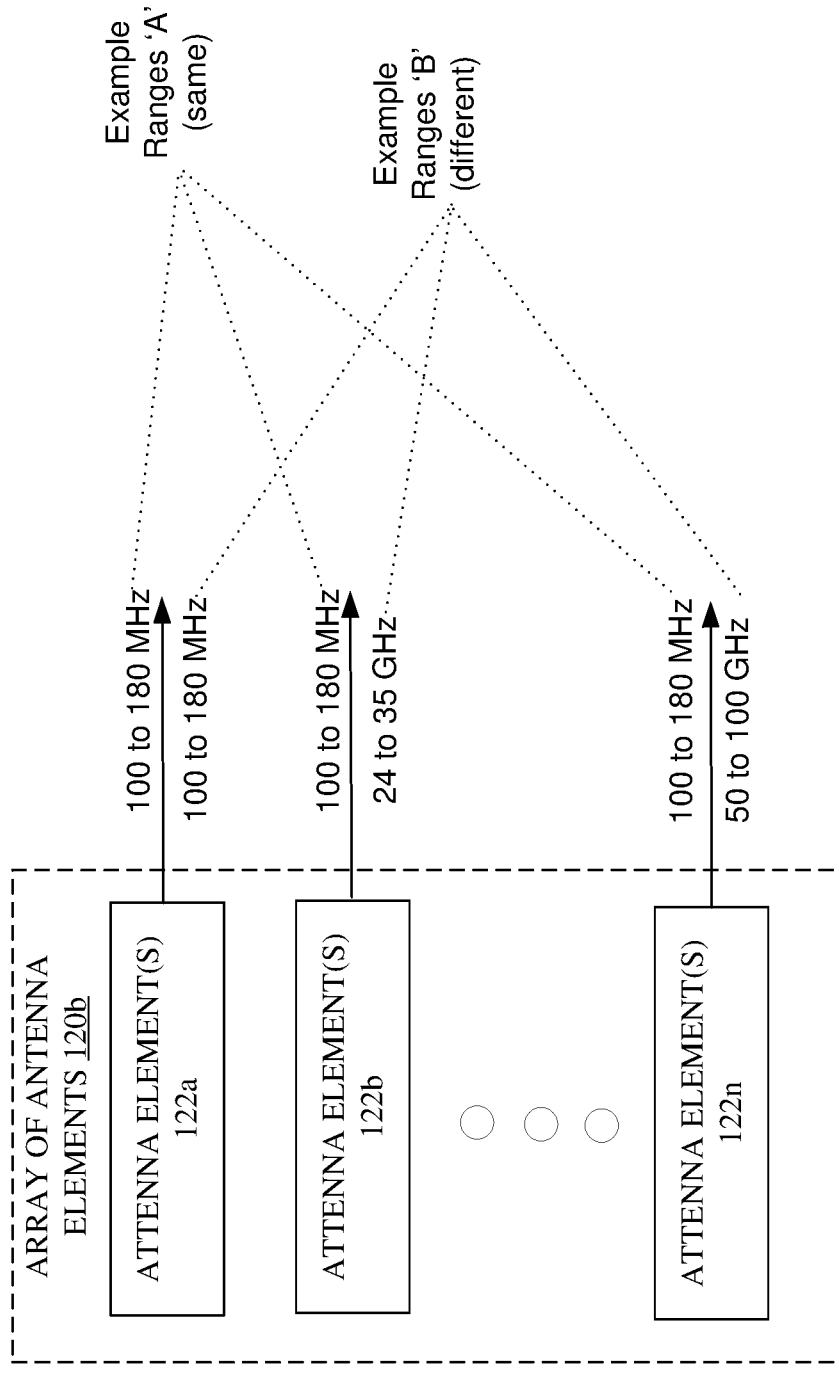
FIG. 4 illustrates a block diagram illustrating, via an array of antenna elements that selectively transmit according to respective power transmission power frequency ranges wireless delivery of power to a power storage element of a wireless device, in accordance with various example embodiments.

FIG. 4 illustrates further alternative embodiments in which, instead of operating at a given frequency, any of the antenna element(s) 122a (one antenna or a group), 122b, . . . , 122n can operate according to a range of frequencies. The range of frequencies can be the same range of frequencies, e.g., 100 to 180 MHz per example ranges 'A', and there can also be different ranges of frequencies for different antenna element(s) 122a, 122b, . . . , 122n, e.g., 100 to 180 MHz for antenna element(s) 122a, 24 to 35 GHz for antenna element(s) 122b, . . . , 50 to 100 GHz for antenna element(s) 122n per example ranges 'B'. The systems of FIGS. 3 and 4 can be mixed and matched in that perhaps some antenna elements operate at a same frequency, while others operate according to a same range of frequencies, while still others can operate according to different ranges of frequencies. In this regard, whichever combination, feedback received by the transmitter helps the antenna management component (140) determine which antennae are going to contribute to a power transmission to a receiver, and at which transmit frequencies those contributing antennae are to transmit.

Figure 5:
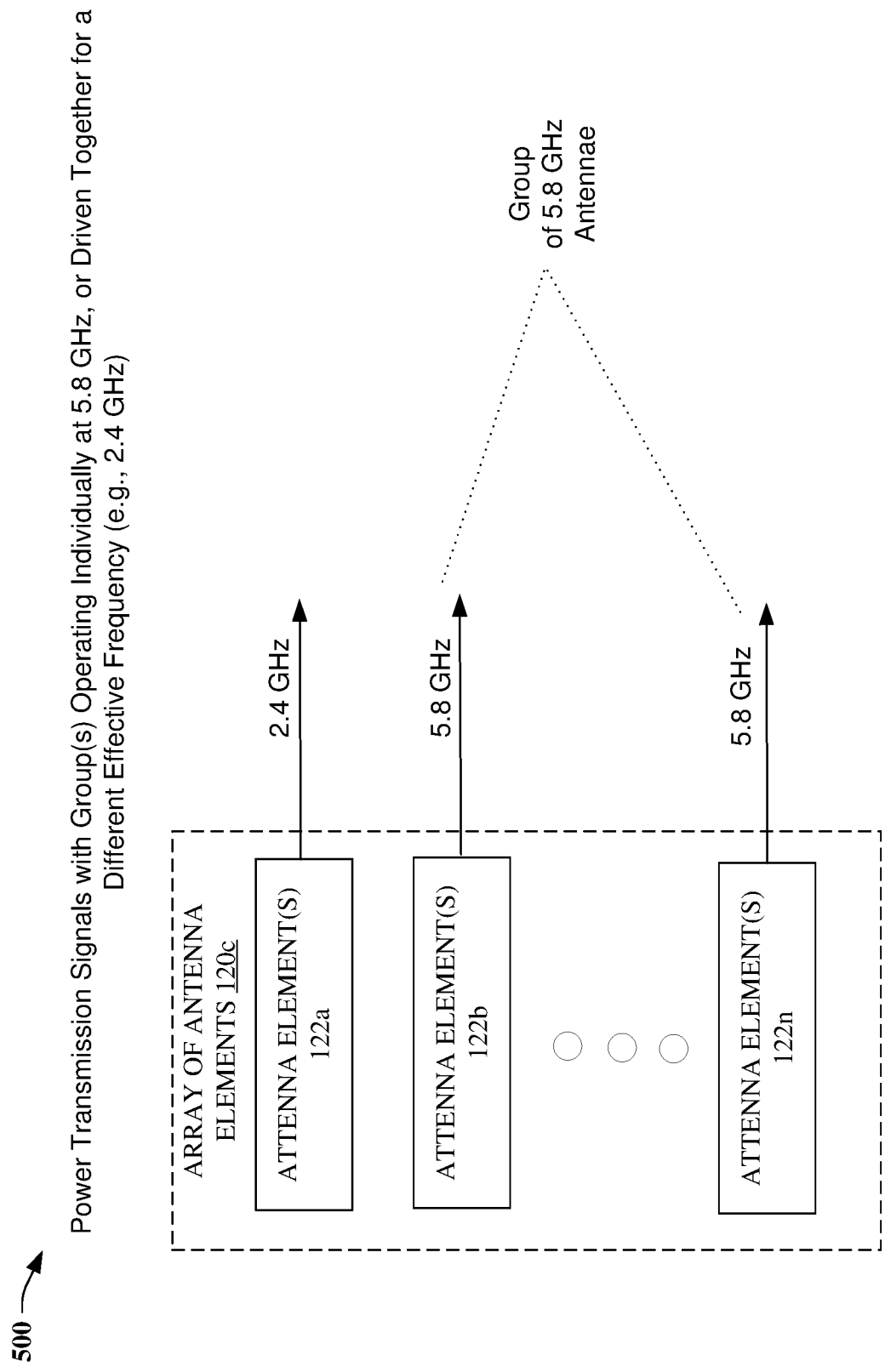
FIG. 5 illustrates a block diagram illustrating, via different group(s) of an array of antenna elements that selectively transmit either individually according to a given frequency, or according to a modified frequency by driving the group(s) together, according to respective power transmission power frequencies whether the groups are operated individually or together, wireless delivery of power to a power storage element of a wireless device, in accordance with various example embodiments.

FIG. 5 illustrates a block diagram illustrating, via different group(s) of an array of antenna elements that selectively transmit either individually according to a given frequency, or according to a modified frequency by driving the group(s) together, according to respective power transmission power frequencies whether the groups are operated individually or together, wireless delivery of power to a power storage element of a wireless device, in accordance with various example embodiments.

As mentioned, a series of resonating elements, e.g., a group of antennae, can be driven together or individually to achieve different frequencies of power transmission signals. For instance, as illustrated in FIG. 5, an array of antenna elements 120c comprises an antenna element 122a that operates at 2.4 GHz and antenna elements 122b . . . 122n that operate individually at a higher frequency, such as 5.8 GHz. Thus, instead of operating the antenna element 122a individually at 2.4 GHz and antenna elements 122b . . . 122n each individually at 5.8 GHz, and switching between individual permutations and/or combinations to determine a best operating frequency for power transmission signals, antenna elements 122b . . . 122n can be driven/resonated together to achieve a different aperture and frequency of transmission than the individual frequencies. For instance, antenna elements 122b . . . 122n, when driven together (e.g., resonated differently in a different mode), causes the second group of 5.8 GHz antennae to emit at a different effective frequency, such as at or about 2.4 GHz, thereby achieving at or about the 2.4 GHz frequency of antenna element 122a in effect, using antenna elements 122b . . . 1226n.

As an example, a method can comprise receiving, by a system comprising a processor via at least one antenna element of an array of antenna elements that has been formed on a substrate, feedback from a wireless charging client relating to a quality of a power charging experience occurring at the wireless charging client as a result of at least one of a first frequency of first power emitted at a first frequency by a first antenna element of the array of antenna elements, a second frequency of second power emitted individually by a group of second antenna elements of the array of antenna elements, or a third frequency of third power emitted together by the group of second antenna elements at an effective frequency that is different than the second frequency.

The example method can further comprise, based on a result of analyzing the feedback, switching from a current emission at a current frequency to at least one of emission of at least one of the first power at the first frequency, emission of the second power at the second frequency, or emission of the third power at the third frequency. Further, in response to the switching, it can be determined that the quality of the power charging experience of the wireless charging device has increased. The effective frequency of the third frequency can be at or about the first frequency. Also, the first frequency and the second frequency can be different frequencies.

Figure 6:
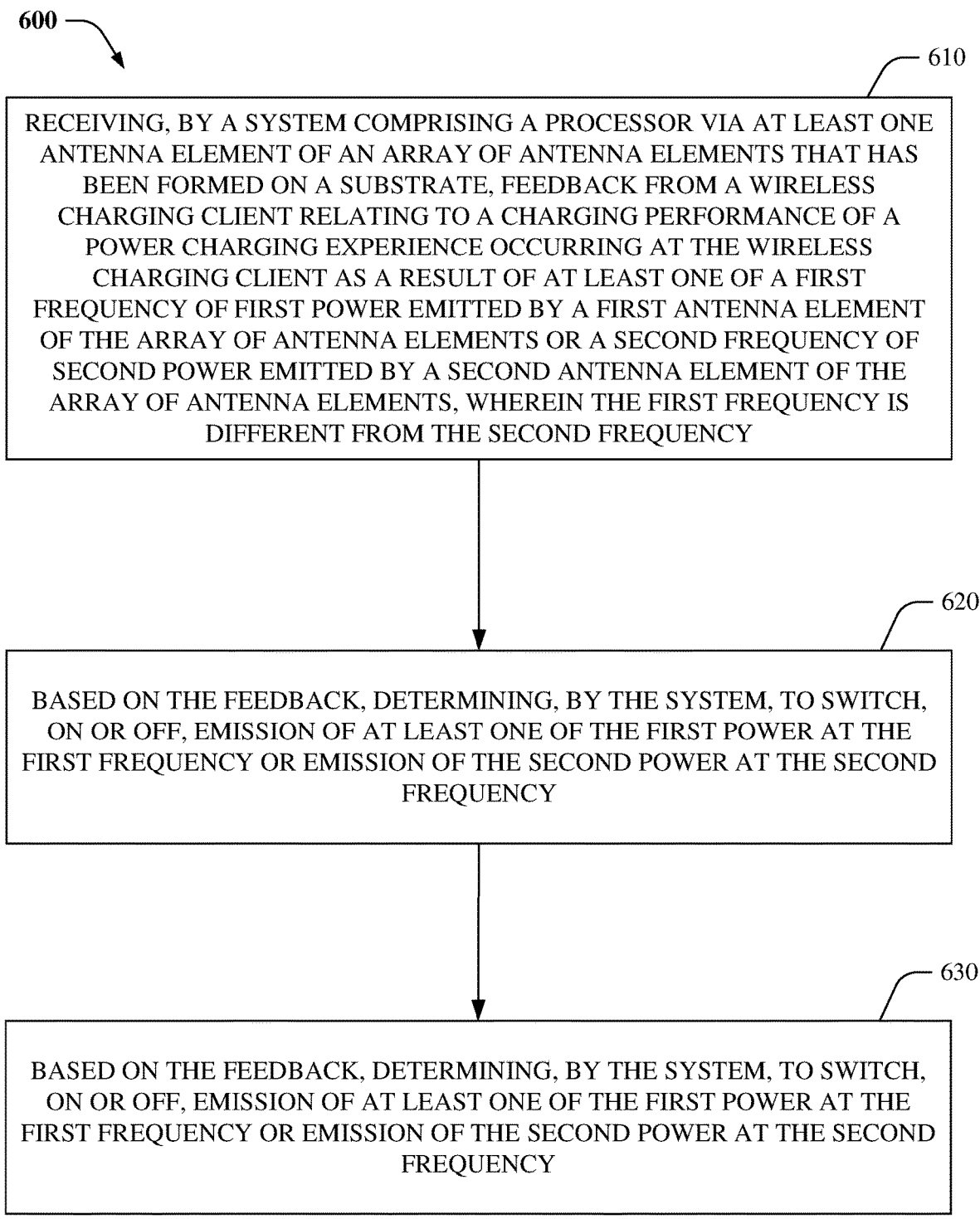
FIG. 6 illustrates a flow chart of a method for facilitating, via an array of antenna elements that adjustably transmit according to different power transmission frequencies, wireless delivery of power to a power storage element of a wireless device, in accordance with various example embodiments.
Figure 7:
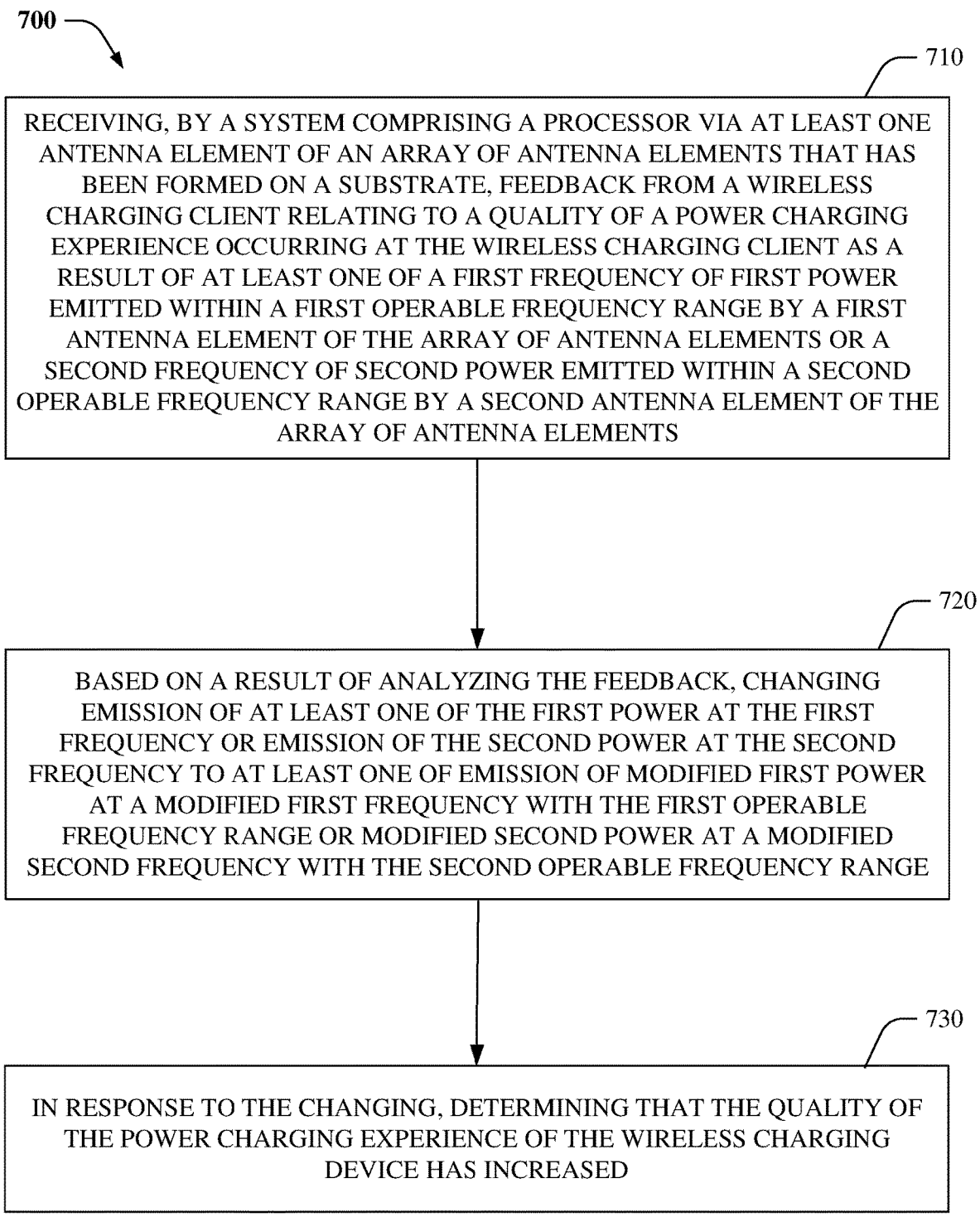
FIG. 7 illustrates a flow chart of another method for facilitating, via an array of antenna elements that selectively transmit according to respective power transmission power frequency ranges wireless delivery of power to a power storage element of a wireless device, in accordance with various example embodiments.

FIGS. 6-7 illustrate methodologies in accordance with the disclosed subject matter. For simplicity of explanation, the methodologies are depicted and described as a series of acts. It is to be understood and appreciated that various embodiments disclosed herein are not limited by the acts illustrated and/or by the order of acts. For example, acts can occur in various orders and/or concurrently, and with other acts not presented or described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events.

Additionally, it should be further appreciated that the methodologies disclosed hereinafter corresponding to an antenna control system (e.g., 310) are capable of being stored on an article of manufacture to facilitate transporting and transferring such methodologies to computing device(s). The term article of manufacture, as used herein, is intended to encompass a computer program accessible from any memory device, computer-readable device, carrier, or media, e.g., a non-transitory computer readable medium, etc.

Referring now to FIG. 6, a flow chart is illustrated of a method (600) applicable to operation of different antenna elements that operate according to different power transmission frequencies, which can be switched on or off. The method (600) can be performed by a system for facilitating, via an array of antenna elements, delivery of power to a power storage element of a wireless device is illustrated, in accordance with various example embodiments. At (610), method (600) comprises receiving, by a system comprising a processor via at least one antenna element of an array of antenna elements that has been formed on a substrate, feedback from a wireless charging client relating to a charging performance of a power charging experience occurring at the wireless charging client as a result of at least one of a first frequency of first power emitted by a first antenna element of the array of antenna elements or a second frequency of second power emitted by a second antenna element of the array of antenna elements, wherein the first frequency is different from the second frequency.

At (620), method (600) further comprises, determining, by the system based on the feedback, to switch, on or off, emission of at least one of the first power at the first frequency or emission of the second power at the second frequency. Further, at (630), method (600) comprises, switching, on or off by the system based on a result of the determining, the emission of the at least one of the first power at the first frequency or emission of the second power at the second frequency, as a result of which the charging performance of the wireless charging device is increased.

Referring now to FIG. 7, a flow chart is illustrated of a method (700) applicable to where an operating frequency of an antenna element can be changed within a frequency range, the method (700) comprising, at (710), receiving, by a system comprising a processor via at least one antenna element of an array of antenna elements that has been formed on a substrate, feedback from a wireless charging client relating to a quality of a power charging experience occurring at the wireless charging client as a result of at least one of a first frequency of first power emitted within a first operable frequency range by a first antenna element of the array of antenna elements or a second frequency of second power emitted within a second operable frequency range by a second antenna element of the array of antenna elements.

At (720), the method (700) further comprises, based on a result of analyzing the feedback, changing emission of at least one of the first power at the first frequency or emission of the second power at the second frequency to at least one of emission of modified first power at a modified first frequency with the first operable frequency range or modified second power at a modified second frequency with the second operable frequency range, and at (730), the method (700) comprises, in response to the changing, determining that the quality of the power charging experience of the wireless charging device has increased.

In this regard, in response to the determining that the quality of the power charging experience of the wireless charging device has increased, the analyzing of the feedback can cease until a change in condition according to a condition change criterion is satisfied. As mentioned, the first and second frequency ranges can be the same or different, overlapping or non-overlapping.

Figure 8:
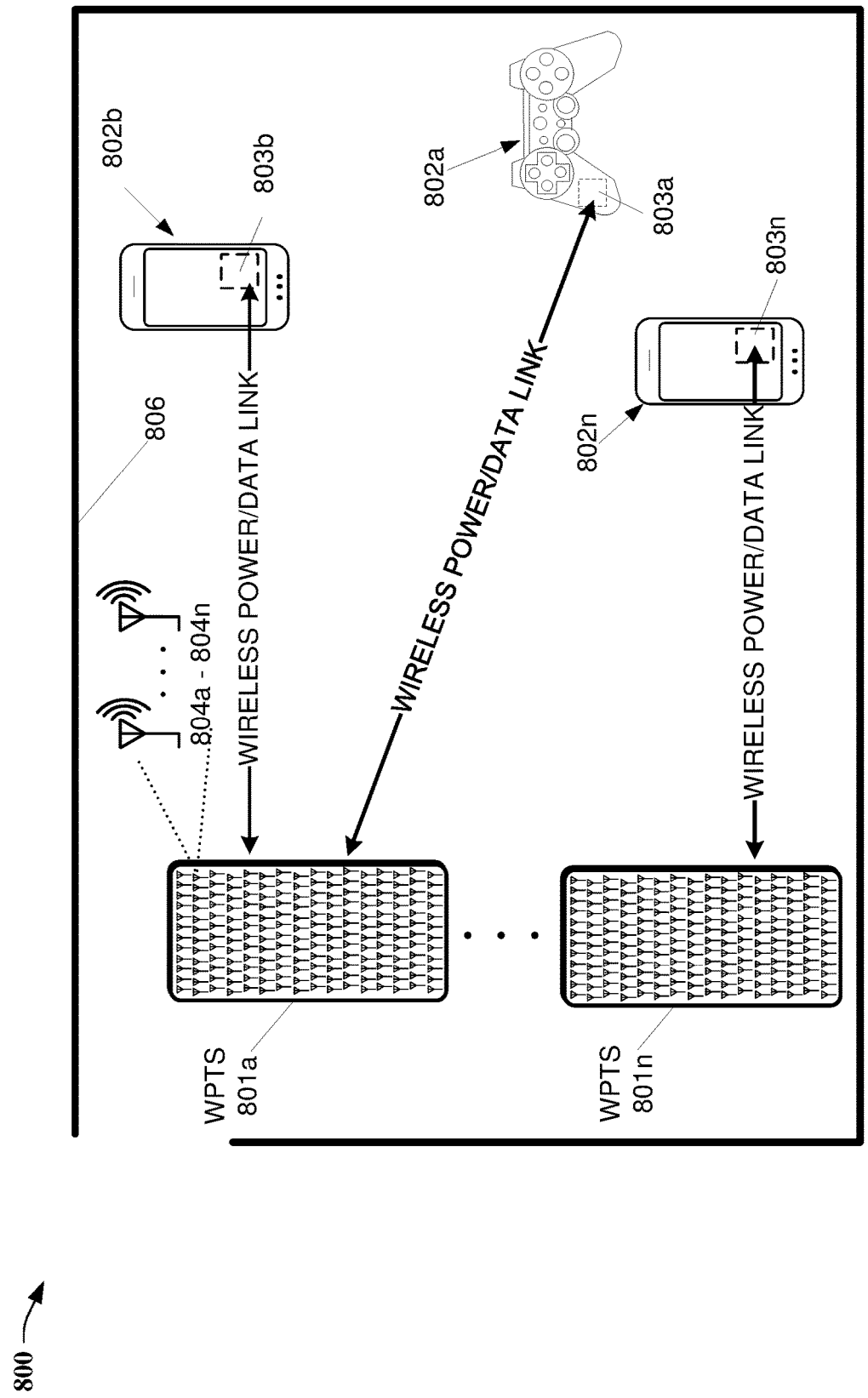
FIG. 8 depicts a block diagram of an example wireless power delivery environment illustrating wireless power delivery from one or more wireless power transmission systems to various wireless devices within the wireless power delivery environment, in accordance with various example embodiments.

FIG. 8 depicts a block diagram including an example wireless power delivery environment 800 illustrating wireless power delivery from one or more wireless power transmission systems (WPTS) 801*a-n* (also referred to as "wireless power delivery systems", "antenna array systems" and "wireless chargers") to various wireless devices 802*a-n* within the wireless power delivery environment 800, according to some embodiments. More specifically, FIG. 8 illustrates an example wireless power delivery environment 800 in which wireless power and/or data can be delivered to available wireless devices 802*a*-802*n* having one or more wireless power receiver clients 803*a*-803*n* (also referred to herein as "clients" and "wireless power receivers"). The wireless power receiver clients are configured to receive and process wireless power from one or more wireless power transmission systems 801*a*-801*n*. Components of an example wireless power receiver client 803 are shown and discussed in greater detail with reference to FIG. 11.

As shown in the example of FIG. 8, the wireless devices 802*a*-802*n* include mobile phone devices and a wireless game controller. However, the wireless devices 802*a*-802*n* can be any device or system that needs power and is capable of receiving wireless power via one or more integrated wireless power receiver clients 803*a*-803*n*. As discussed herein, the one or more integrated wireless power receiver clients receive and process power from one or more wireless power transmission systems 801*a*-801*n* and provide the power to the wireless devices 802*a*-802*n* (or internal batteries of the wireless devices) for operation thereof.

Each wireless power transmission system 801 can include multiple antennas 804*a-n*, e.g., an antenna array including hundreds or thousands of antennas, which are capable of delivering wireless power to wireless devices 802*a*-802*n*. In some embodiments, the antennas are adaptively-phased RF antennas. The wireless power transmission system 801 is capable of determining the appropriate phases with which to deliver a coherent power transmission signal to the wireless power receiver clients 803*a*-803*n*. The array is configured to emit a signal (e.g., continuous wave or pulsed power transmission signal) from multiple antennas at a specific phase relative to each other. It is appreciated that use of the term "array" does not necessarily limit the antenna array to any specific array structure. That is, the antenna array does not need to be structured in a specific "array" form or geometry. Furthermore, as used herein the term "array" or "array system" may include related and peripheral circuitry for signal generation, reception and transmission, such as radios, digital logic and modems. In some embodiments, the wireless power transmission system 801 can have an embedded WiFi hub for data communications via one or more antennas or transceivers.

The wireless devices 802 can include one or more wireless power receiver clients 803. As illustrated in the example of FIG. 8, power delivery antennas 804*a*-804*n* are shown. The power delivery antennas 804*a* are configured to provide delivery of wireless radio frequency power in the wireless power delivery environment. In some embodiments, one or more of the power delivery antennas 804a-804n can alternatively or additionally be configured for data communications in addition to or in lieu of wireless power delivery. The one or more data communication antennas are configured to send data communications to and receive data communications from the wireless power receiver clients 803a-803n and/or the wireless devices 802a-802n. In some embodiments, the data communication antennas can communicate via Bluetooth™, WiFi™, ZigBee™, etc. Other data communication protocols are also possible.

Each wireless power receiver client 803a-803n includes one or more antennas (not shown) for receiving signals from the wireless power transmission systems 801a-801n. Likewise, each wireless power transmission system 801a-801n includes an antenna array having one or more antennas and/or sets of antennas capable of emitting continuous wave or discrete (pulse) signals at specific phases relative to each other. As discussed above, each of the wireless power transmission systems 801a-801n is capable of determining the appropriate phases for delivering the coherent signals to the wireless power receiver clients 802a-802n. For example, in some embodiments, coherent signals can be determined by computing the complex conjugate of a received beacon (or calibration) signal at each antenna of the array such that the coherent signal is phased for delivering power to the particular wireless power receiver client that transmitted the beacon (or calibration) signal.

Although not illustrated, each component of the environment, e.g., wireless device, wireless power transmission system, etc., can include control and synchronization mechanisms, e.g., a data communication synchronization module. The wireless power transmission systems 801a-801n can be connected to a power source such as, for example, a power outlet or source connecting the wireless power transmission systems to a standard or primary AC power supply in a building. Alternatively, or additionally, one or more of the wireless power transmission systems 801a-801n can be powered by a battery or via other mechanisms, e.g., solar cells, etc.

The wireless power receiver clients 802a-802n and/or the wireless power transmission systems 801a-801n are configured to operate in a multipath wireless power delivery environment. That is, the wireless power receiver clients 802a-802n and the wireless power transmission systems 801a-801n are configured to utilize reflective objects 806 such as, for example, walls or other RF reflective obstructions within range to transmit beacon (or calibration) signals and/or receive wireless power and/or data within the wireless power delivery environment. The reflective objects 806 can be utilized for multi-directional signal communication regardless of whether a blocking object is in the line of sight between the wireless power transmission system and the wireless power receiver clients 803a-803n.

As described herein, each wireless device 802a-802n can be any system and/or device, and/or any combination of devices/systems that can establish a connection with another device, a server and/or other systems within the example environment 800. In some embodiments, the wireless devices 802a-802n include displays or other output functionalities to present data to a user and/or input functionalities to receive data from the user. By way of example, a wireless device 802 can be, but is not limited to, a video game controller, a server desktop, a desktop computer, a computer cluster, a mobile computing device such as a notebook, a laptop computer, a handheld computer, a mobile phone, a smart phone, a PDA, a Blackberry device, a Treo, and/or an iPhone, etc. By way of example and not limitation, the wireless device 802 can also be any wearable device such as watches, necklaces, rings or even devices embedded on or within the customer. Other examples of a wireless device 802 include, but are not limited to, safety sensors (e.g., fire or carbon monoxide), electric toothbrushes, electronic door lock/handles, electric light switch controller, electric shavers, etc.

Although not illustrated in the example of FIG. 8, the wireless power transmission system 801 and the wireless power receiver clients 803a-803n can each include a data communication module for communication via a data channel. Alternatively, or additionally, the wireless power receiver clients 803a-803n can direct the wireless devices 802a-802n to communicate with the wireless power transmission system via existing data communications modules. In some embodiments, the beacon signal, which is primarily referred to herein as a continuous waveform, can alternatively or additionally take the form of a modulated signal.

Figure 9:
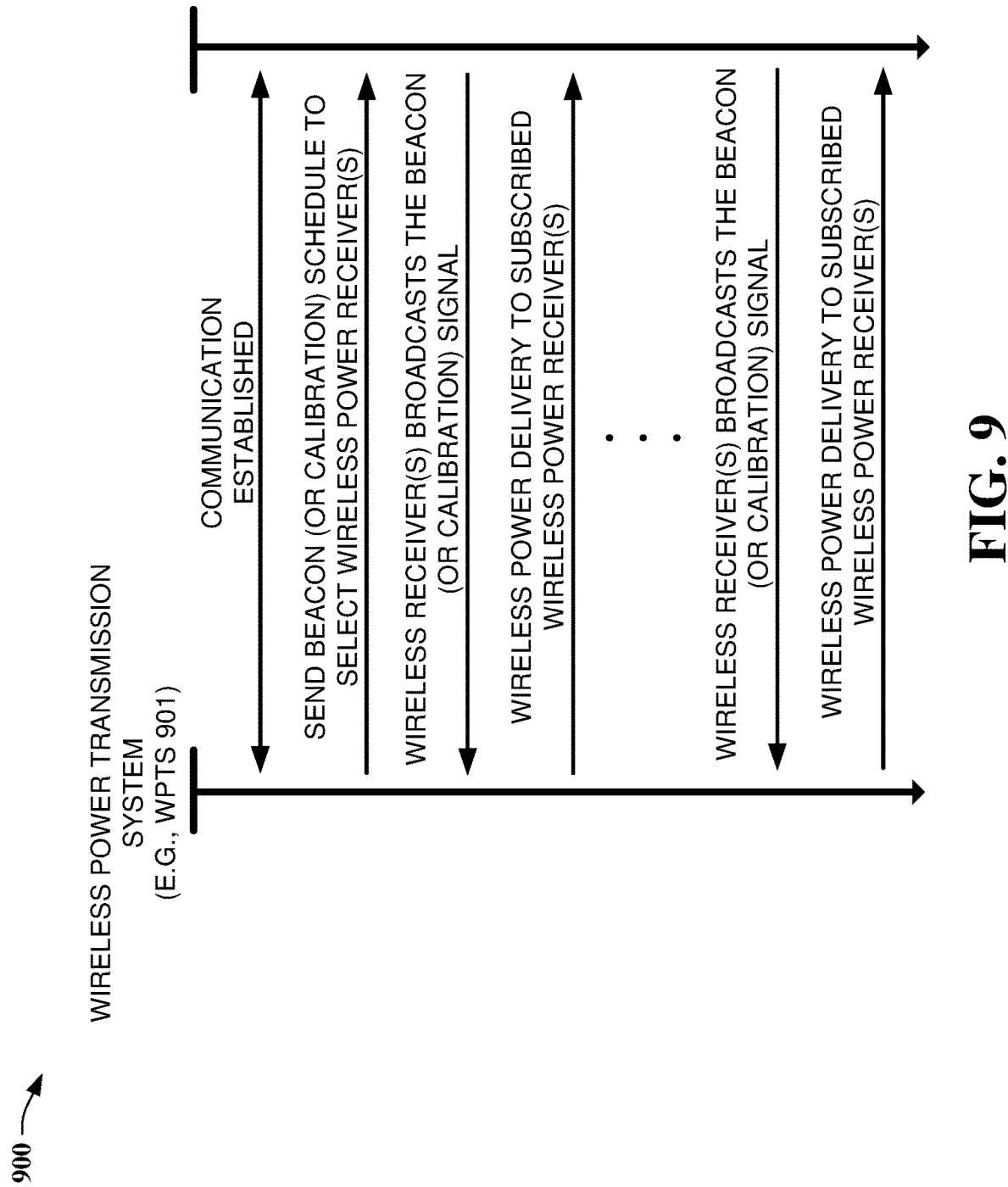
FIG. 9 depicts a sequence diagram illustrating example operations between a wireless power transmission system and a wireless receiver client for commencing wireless power delivery, in accordance with various example embodiments.

FIG. 9 depicts a sequence diagram 900 illustrating example operations between a wireless power delivery system (e.g., system 110, wireless power transmission system 801, etc.) and a wireless power receiver client 803 for establishing wireless power delivery in a multipath wireless power delivery, according to an embodiment. Initially, communication is established between the wireless power delivery system and the power receiver client. The initial communication can be, for example, a data communication link that is established via one or more antennas (e.g., 804a-804n) of the wireless power transmission system. As discussed, in some embodiments, one or more of the antennas can be data antennas, wireless power transmission antennas, or dual-purpose data/power antennas. Various information can be exchanged between the wireless power transmission system and the wireless power receiver client over this data communication channel. For example, wireless power signaling can be time sliced among various clients in a wireless power delivery environment. In such cases, the wireless power transmission system can send beacon schedule information, e.g., Beacon Beat Schedule (BBS) cycle, power cycle information, etc., so that the wireless power receiver client knows when to transmit (broadcast) its beacon signals and when to listen for power, etc.

Continuing with the example of FIG. 8, the wireless power transmission system selects one or more wireless power receiver clients for receiving power and sends the beacon schedule information to the selected wireless power receiver clients. The wireless power transmission system can also send power transmission scheduling information so that the wireless power receiver client knows when to expect (e.g., a window of time) wireless power from the wireless power transmission system. The wireless power receiver client then generates a beacon (or calibration) signal and broadcasts the beacon during an assigned beacon transmission window (or time slice) indicated by the beacon schedule information, e.g., BBS cycle. As discussed herein, the wireless power receiver client includes one or more antennas (or transceivers) that have a radiation and reception pattern in three-dimensional space proximate to the wireless device in which the wireless power receiver client is embedded.

The wireless power transmission system receives the beacon from the power receiver client and detects and/or otherwise measures the phase (or direction) from which the beacon signal is received at multiple antennas. The wireless power transmission system then delivers wireless power to the power receiver client from the multiple antennas based on the detected or measured phase (or direction) of the received beacon at each of the corresponding antennas. In some embodiments, the wireless power transmission system determines the complex conjugate of the measured phase of the beacon and uses the complex conjugate to determine a transmit phase that configures the antennas for delivering and/or otherwise directing wireless power to the wireless power receiver client via the same path over which the beacon signal was received from the wireless power receiver client.

In some embodiments, the wireless power transmission system includes many antennas. One or more of the many antennas may be used to deliver power to the power receiver client. The wireless power transmission system can detect and/or otherwise determine or measure phases at which the beacon signals are received at each antenna. The large number of antennas may result in different phases of the beacon signal being received at each antenna of the wireless power transmission system. As discussed above, the wireless power transmission system can determine the complex conjugate of the beacon signals received at each antenna. Using the complex conjugates, one or more antennas may emit a signal that takes into account the effects of the large number of antennas in the wireless power transmission system. In other words, the wireless power transmission system can emit a wireless power transmission signal from one or more antennas in such a way as to create an aggregate signal from the one or more of the antennas that approximately recreates the waveform of the beacon in the opposite direction. Said another way, the wireless power transmission system can deliver wireless RF power to the wireless power receiver clients via the same paths over which the beacon signal is received at the wireless power transmission system. These paths can utilize reflective objects 806 within the environment. Additionally, the wireless power transmission signals can be simultaneously transmitted from the wireless power transmission system such that the wireless power transmission signals collectively match the antenna radiation and reception pattern of the client device in a three-dimensional (3D) space proximate to the client device.

As shown, the beacon (or calibration) signals can be periodically transmitted by wireless power receiver clients within the power delivery environment according to, for example, the BBS, so that the wireless power transmission system can maintain knowledge and/or otherwise track the location of the power receiver clients in the wireless power delivery environment. The process of receiving beacon signals from a wireless power receiver client at the wireless power transmission system and, in turn, responding with wireless power directed to that particular wireless power receiver client is referred to herein as retrodirective wireless power delivery.

Furthermore, as discussed herein, wireless power can be delivered in power cycles defined by power schedule information. A more detailed example of the signaling required to commence wireless power delivery is described now with reference to FIG. 9.

Figure 10:
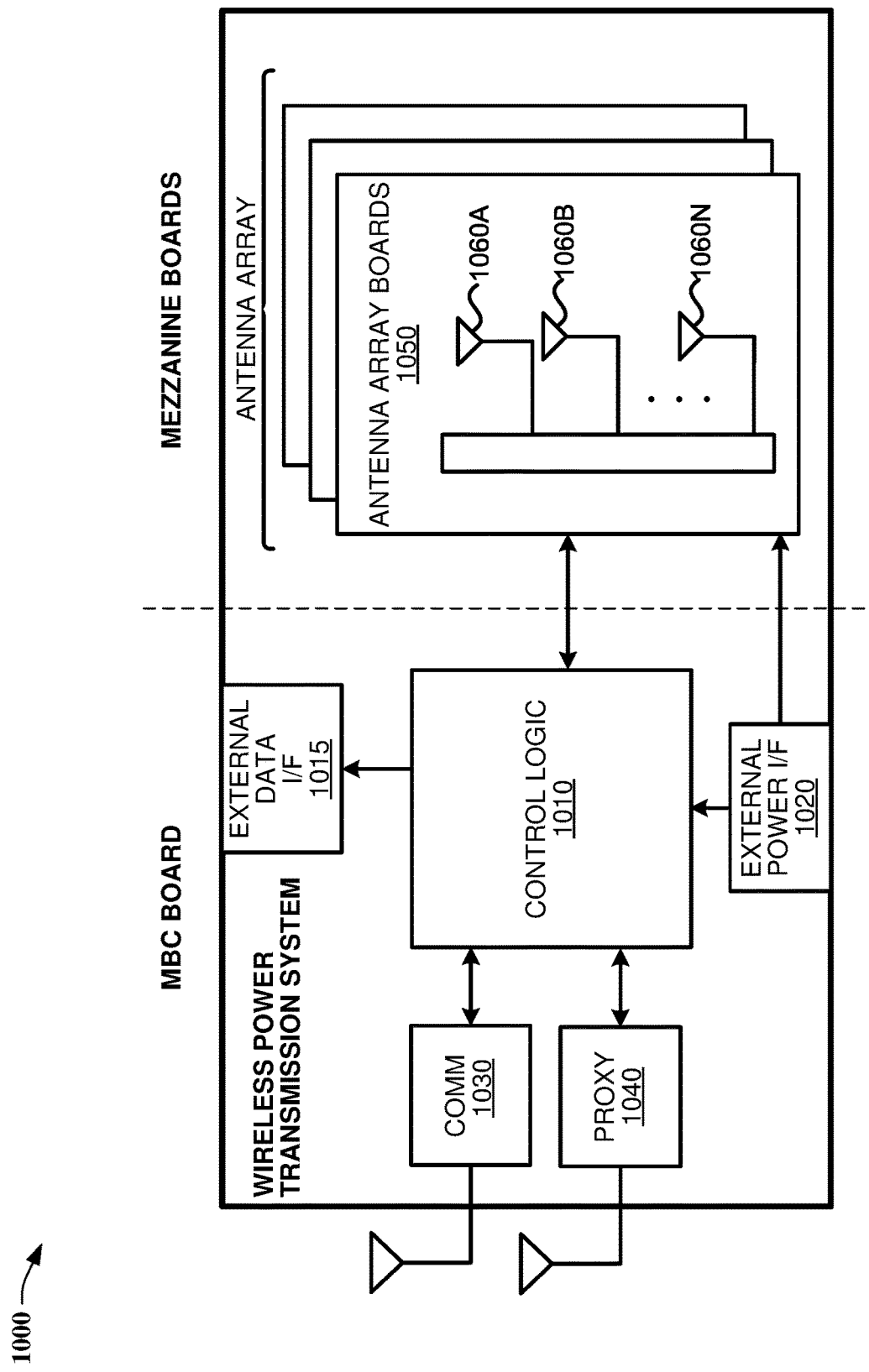
FIG. 10 depicts a block diagram illustrating example components of a wireless power transmission system, in accordance with various example embodiments.

FIG. 10 depicts a block diagram illustrating example components of a wireless power transmission system 1000, in accordance with an embodiment. As illustrated in the example of FIG. 10, the wireless power transmission system 1000 includes a master bus controller (MBC) board and multiple mezzanine boards that collectively comprise the antenna array. It should be appreciated that in other embodiment(s) (not shown), the wireless power transmission system 1000 can be communicatively coupled to AMUs 150, e.g., in addition to, or in lieu of, being communicatively coupled to the antenna array via the multiple mezzanine boards. In this regard, one or more component(s) of the MBC can be communicatively coupled to system 110, etc. to facilitate performance of one or more operations described herein with respect to a wireless power delivery system (e.g., system 110, antenna control system 210, WPTS 801a . . . 801n, and/or WPTS 1000, etc.)

The MBC includes control logic 1010, an external data interface (I/F) 1015, an external power interface (I/F) 1020, a communication block 1030 and proxy 1040. The mezzanine boards (or antenna array boards 950) each include multiple antennas 1060a-1060n. Some or all of the components can be omitted in some embodiments. Additional components are also possible. For example, in some embodiments only one of communication block 1030 or proxy 1040 may be included.

The control logic 1010 is configured to provide control and intelligence to the array components. The control logic 1010 may comprise one or more processors, FPGAs, memory units, etc., and direct and control the various data and power communications. The communication block 930 can direct data communications on a data carrier frequency, such as the base signal clock for clock synchronization. The data communications can be Bluetooth™, WiFi™, ZigBee™, etc., including combinations or variations thereof. Likewise, the proxy 1040 can communicate with clients via data communications as discussed herein. The data communications can be, by way of example and not limitation, Bluetooth™, WiFi™, ZigBee™, etc. Other communication protocols are possible.

In some embodiments, the control logic 1010 can also facilitate and/or otherwise enable data aggregation for Internet of Things (IoT) devices. In some embodiments, wireless power receiver clients can access, track and/or otherwise obtain IoT information about the device in which the wireless power receiver client is embedded and provide that IoT information to the wireless power transmission system over a data connection. This IoT information can be provided to via an external data interface 1015 to a central or cloud-based system (not shown) where the data can be aggregated, processed, etc. For example, the central system can process the data to identify various trends across geographies, wireless power transmission systems, environments, devices, etc. In some embodiments, the aggregated data and or the trend data can be used to improve operation of the devices via remote updates, etc. Alternatively, or additionally, in some embodiments, the aggregated data can be provided to third party data consumers. In this manner, the wireless power transmission system acts as a Gateway or Enabler for the IoT devices. By way of example and not limitation, the IoT information can include capabilities of the device in which the wireless power receiver client is embedded, usage information of the device, power levels of the device, information obtained by the device or the wireless power receiver client itself, e.g., via sensors, etc.

The external power interface 1020 is configured to receive external power and provide the power to various components. In some embodiments, the external power interface 1020 may be configured to receive a standard external 24 Volt power supply. In other embodiments, the external power interface 1020 can be, for example, 120/240 Volt alternating current (AC) mains to an embedded direct current (DC) power supply that sources the required 12/24/48 Volt DC to provide the power to various components. Alternatively, the external power interface could be a DC supply that sources the required 12/24/48 Volts DC. Alternative configurations are also possible.

In operation, the MBC, which controls the wireless power transmission system, receives power from a power source and is activated. The MBC then activates proxy antenna elements (e.g., 210, 1060a-1060n, etc.) on the wireless power transmission system and the proxy antenna elements enter a default "discovery" mode to identify available wireless receiver clients within range of the wireless power transmission system. When a client is found, the antenna elements on the wireless power transmission system power on, enumerate, and (optionally) calibrate.

The MBC then generates beacon transmission scheduling information and power transmission scheduling information during a scheduling process. The scheduling process includes selection of power receiver clients. For example, the MBC can select power receiver clients for power transmission and generate a BBS cycle and a Power Schedule (PS) for the selected wireless power receiver clients. As discussed herein, the power receiver clients can be selected based on their corresponding properties and/or requirements.

In some embodiments, the MBC can also identify and/or otherwise select available clients that will have their status queried in the Client Query Table (CQT). Clients that are placed in the CQT are those on "standby", e.g., not receiving a charge. The BBS and PS are calculated based on vital information about the clients such as, for example, battery status, current activity/usage, how much longer the client has until it runs out of power, priority in terms of usage, etc.

The Proxy Antenna Element (AE) broadcasts the BBS to all clients. As discussed herein, the BBS indicates when each client should send a beacon Likewise, the PS indicates when and to which clients the array should send power to and when clients should listen for wireless power. Each client starts broadcasting its beacon and receiving power from the array per the BBS and PS. The Proxy AE can concurrently query the Client Query Table to check the status of other available clients. In some embodiments, a client can only exist in the BBS or the CQT (e.g., waitlist), but not in both. The information collected in the previous step continuously and/or periodically updates the BBS cycle and/or the PS.

Figure 11:
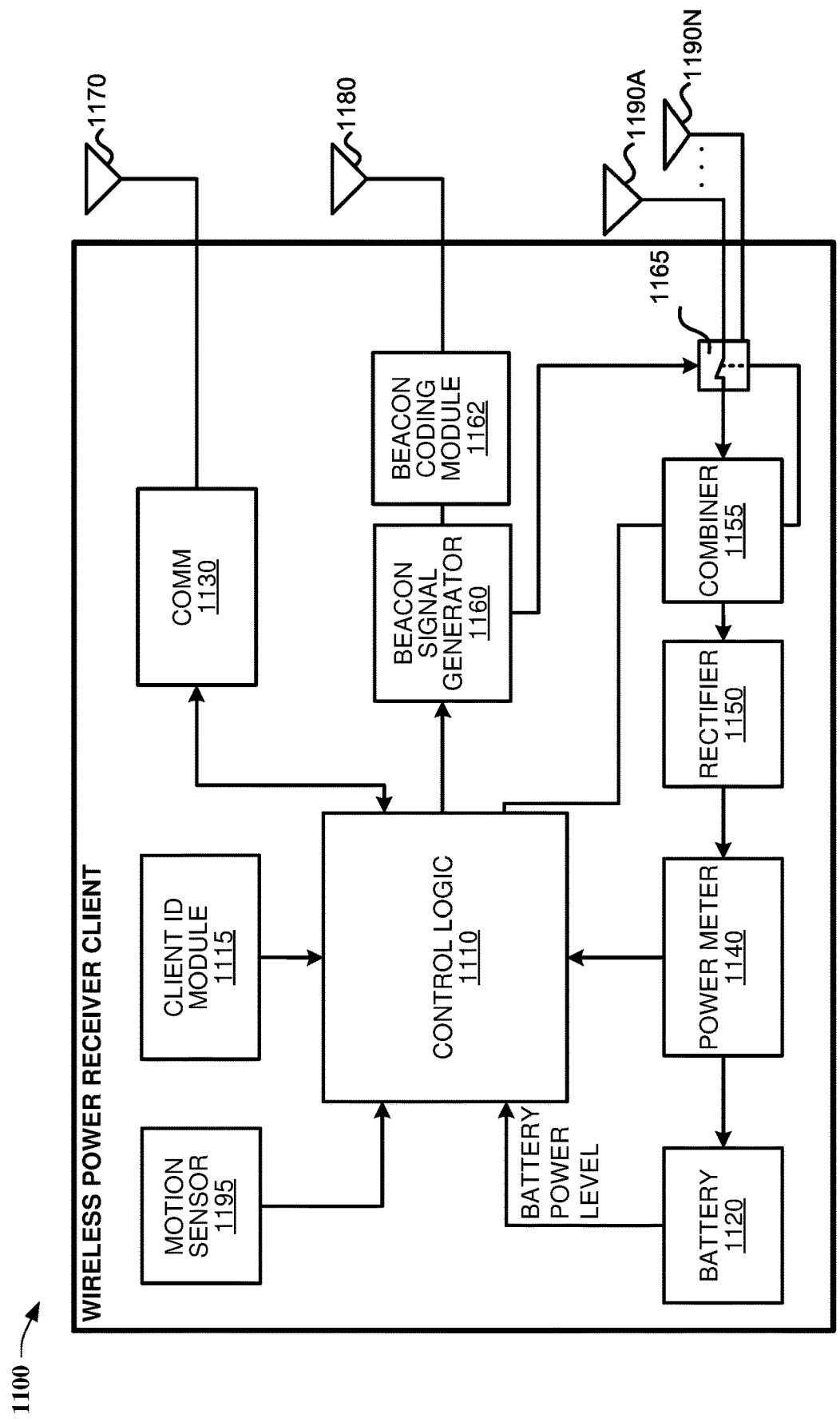
FIG. 11 depicts a block diagram illustrating example components of a wireless power receiver client, in accordance with various example embodiments.

FIG. 11 is a block diagram illustrating example components of a wireless power receiver client 1100, in accordance with some embodiments. As illustrated in the example of FIG. 11, the wireless power receiver client 1100 includes control logic 1110, battery 1120, an IoT control module 1125, communication block 1130 and associated antenna 1170, power meter 1140, rectifier 1150, a combiner 1155, beacon signal generator 1160, beacon coding unit 1162 and an associated antenna 1180, and switch 1165 connecting the rectifier 1150 or the beacon signal generator 1160 to one or more associated antennas 1190a-n. Some or all of the components can be omitted in some embodiments. For example, in some embodiments, the wireless power receiver client 1100 does not include its own antennas but instead utilizes and/or otherwise shares one or more antennas (e.g., WiFi antenna) of the wireless device (e.g., wireless devices 702, etc.) in which the wireless power receiver client is embedded. Moreover, in some embodiments, the wireless power receiver client may include a single antenna that provides data transmission functionality as well as power/data reception functionality. Additional components are also possible.

A combiner 1155 receives and combines the received power transmission signals from the power transmitter in the event that the receiver 1100 has more than one antenna. The combiner can be any combiner or divider circuit that is configured to achieve isolation between the output ports while maintaining a matched condition. For example, the combiner 1155 can be a Wilkinson Power Divider circuit. The rectifier 1150 receives the combined power transmission signal from the combiner 1155, if present, which is fed through the power meter 1140 to the battery 1120 for charging. In other embodiments, each antenna's power path can have its own rectifier 1150 and the DC power out of the rectifiers is combined prior to feeding the power meter 1140. The power meter 1140 can measure the received power signal strength and provides the control logic 1110 with this measurement.

Battery 1120 can include protection circuitry and/or monitoring functions. Additionally, the battery 1120 can include one or more features, including, but not limited to, current limiting, temperature protection, over/under voltage alerts and protection, and coulomb monitoring.

The control logic 1110 receives and processes the battery power level from the battery 1120 itself. The control logic 1110 may also transmit/receive via the communication block 1130 a data signal on a data carrier frequency, such as the base signal clock for clock synchronization. The beacon signal generator 1160 generates the beacon signal, or calibration signal, transmits the beacon signal using either the antenna 1180 or 1190 after the beacon signal is encoded.

It may be noted that, although the battery 1120 is shown as charged by, and providing power to, the wireless power receiver client 1100, the receiver may also receive its power directly from the rectifier 1150. This may be in addition to the rectifier 1150 providing charging current to the battery 1120, or in lieu of providing charging. Also, it may be noted that the use of multiple antennas is one example of implementation and the structure may be reduced to one shared antenna.

In some embodiments, the control logic 1110 and/or the IoT control module 1125 can communicate with and/or otherwise derive IoT information from the device in which the wireless power receiver client 1100 is embedded. Although not shown, in some embodiments, the wireless power receiver client 1100 can have one or more data connections (wired or wireless) with the device in which the wireless power receiver client 1100 is embedded over which IoT information can be obtained. Alternatively, or additionally, IoT information can be determined and/or inferred by the wireless power receiver client 1100, e.g., via one or more sensors. As discussed above, the IoT information can include, but is not limited to, information about the capabilities of the device in which the wireless power receiver client 1100 is embedded, usage information of the device in which the wireless power receiver client 1100 is embedded, power levels of the battery or batteries of the device in which the wireless power receiver client 1100 is embedded, and/or information obtained or inferred by the device in which the wireless power receiver client is embedded or the wireless power receiver client itself, e.g., via sensors, etc.

In some embodiments, a client identifier (ID) module 1115 stores a client ID that can uniquely identify the wireless power receiver client 1100 in a wireless power delivery environment. For example, the ID can be transmitted to one or more wireless power transmission systems when communication is established. In some embodiments, wireless power receiver clients may also be able to receive and identify other wireless power receiver clients in a wireless power delivery environment based on the client ID.

An optional motion sensor 1195 can detect motion and signal the control logic 1110 to act accordingly. For example, a device receiving power may integrate motion detection mechanisms such as accelerometers or equivalent mechanisms to detect motion. Once the device detects that it is in motion, it may be assumed that it is being handled by a user, and would trigger a signal to the array to either to stop transmitting power, or to lower the power transmitted to the device. In some embodiments, when a device is used in a moving environment like a car, train or plane, the power might only be transmitted intermittently or at a reduced level unless the device is critically low on power.

Figure 12A:
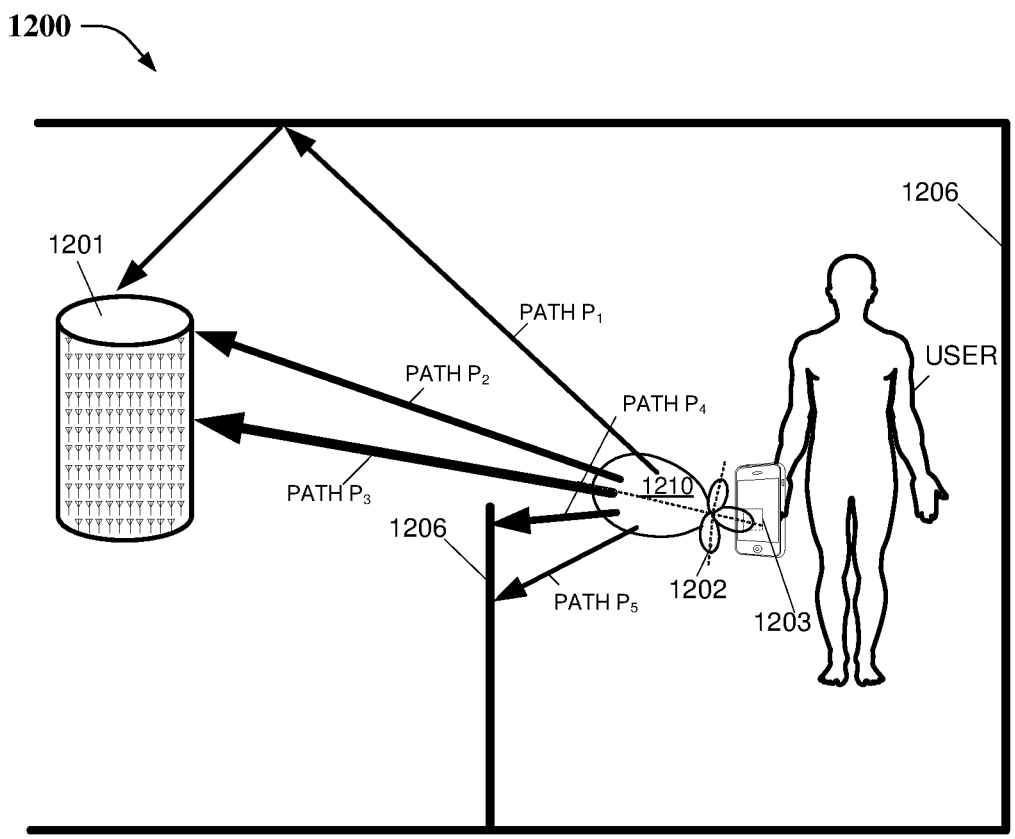
FIGS. 12A and 12B depict block diagrams illustrating example multipath wireless power delivery environments, in accordance with various example embodiments.
Figure 12B:
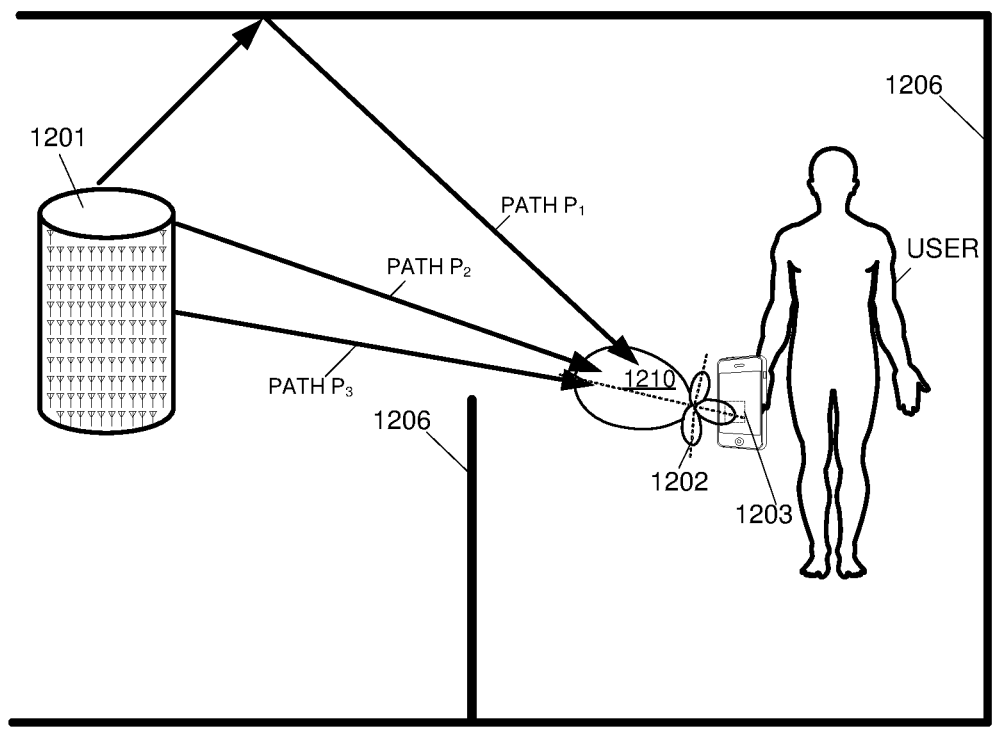

FIGS. 12A and 12B depict diagrams illustrating an example multipath wireless power delivery environment 1200, according to some embodiments. The multipath wireless power delivery environment 1200 includes a user operating a wireless device (e.g., 1202, etc.) including one or more wireless power receiver clients (e.g., 1203). The wireless device 1202 can be wireless device 802, etc.; and the one or more wireless power receiver clients 1203 can be the wireless power receiver client 803 or the wireless power receiver client 1100, although alternative configurations are possible. Likewise, wireless power transmission system 1201 can be wireless power transmission system 801 or wireless power transmission system 1000, although alternative configurations are possible. The multipath wireless power delivery environment 1200 includes reflective objects 1206 and various absorptive objects, e.g., users, or humans, furniture, etc.

Wireless device 1202 includes one or more antennas (or transceivers) that have a radiation and reception pattern 1210 in three-dimensional space proximate to the wireless device 1202. The one or more antennas (or transceivers) can be wholly or partially included as part of the wireless device 1202 and/or the wireless power receiver client (not shown). For example, in some embodiments one or more antennas, e.g., WiFi, Bluetooth, etc. of the wireless device 1202 can be utilized and/or otherwise shared for wireless power reception. As shown in the examples of FIGS. 12A and 12B, the radiation and reception pattern 1210 comprises a lobe pattern with a primary lobe and multiple side lobes. Other patterns are also possible.

The wireless device 1202 transmits a beacon (or calibration) signal over multiple paths to the wireless power transmission system 1201. As discussed herein, the wireless device 1202 transmits the beacon in the direction of the radiation and reception pattern 1210 such that the strength of the received beacon signal by the wireless power transmission system, e.g., received signal strength indication (RSSI), depends on the radiation and reception pattern 1210. For example, beacon signals are not transmitted where there are nulls in the radiation and reception pattern 1210 and beacon signals are the strongest at the peaks in the radiation and reception pattern 1210, e.g., peak of the primary lobe. As shown in the example of FIG. 12A, the wireless device 1202 transmits beacon signals over five paths P1-P5. Paths P4 and P5 are blocked by reflective and/or absorptive object 1206. The wireless power transmission system 1201 receives beacon signals of increasing strengths via paths P1-P3. The bolder lines indicate stronger signals. In some embodiments, the beacon signals are directionally transmitted in this manner, for example, to avoid unnecessary RF energy exposure to the user.

A fundamental property of antennas is that the receiving pattern (sensitivity as a function of direction) of an antenna when used for receiving is identical to the far-field radiation pattern of the antenna when used for transmitting. This is a consequence of the reciprocity theorem in electromagnetism. As shown in the example of FIGS. 12A and 12B, the radiation and reception pattern 1210 is a three-dimensional lobe shape. However, the radiation and reception pattern 1210 can be any number of shapes depending on the type or types, e.g., horn antennas, simple vertical antenna, etc. used in the antenna design. For example, the radiation and reception pattern 1210 can comprise various directive patterns. Any number of different antenna radiation and reception patterns are possible for each of multiple client devices in a wireless power delivery environment.

Referring again to FIG. 12A, the wireless power transmission system 1201 receives the beacon (or calibration) signal via multiple paths P1-P3 at multiple antennas or transceivers. As shown, paths P2 and P3 are direct line of sight paths while path P1 is a non-line of sight path. Once the beacon (or calibration) signal is received by the wireless power transmission system 1201, the power transmission system 1201 processes the beacon (or calibration) signal to determine one or more receive characteristics of the beacon signal at each of the multiple antennas. For example, among other operations, the wireless power transmission system 1201 can measure the phases at which the beacon signal is received at each of the multiple antennas or transceivers.

The wireless power transmission system 1201 processes the one or more receive characteristics of the beacon signal at each of the multiple antennas to determine or measure one or more wireless power transmit characteristics for each of the multiple RF transceivers based on the one or more receive characteristics of the beacon (or calibration) signal as measured at the corresponding antenna or transceiver. By way of example and not limitation, the wireless power transmit characteristics can include phase settings for each antenna or transceiver, transmission power settings, etc.

As discussed herein, the wireless power transmission system 1201 determines the wireless power transmit characteristics such that, once the antennas or transceivers are configured, the multiple antennas or transceivers are operable to transit a wireless power signal that matches the client radiation and reception pattern in the three-dimensional space proximate to the client device. FIG. 12B illustrates the wireless power transmission system 1201 transmitting wireless power via paths P1-P3 to the wireless device 1202. Advantageously, as discussed herein, the wireless power signal matches the client radiation and reception pattern 1210 in the three-dimensional space proximate to the client device. Said another way, the wireless power transmission system will transmit the wireless power signals in the direction in which the wireless power receiver has maximum gain, e.g., will receive the most wireless power.

As a result, no signals are sent in directions in which the wireless power receiver cannot receive power, e.g., nulls and blockages. In some embodiments, the wireless power transmission system 1201 measures the RSSI of the received beacon signal and if the beacon is less than a threshold value, the wireless power transmission system will not send wireless power over that path.

The three paths shown in the examples of FIGS. 12A and 12B are illustrated for simplicity, it is appreciated that any number of paths can be utilized for transmitting power to the wireless device 1202 depending on, among other factors, reflective and absorptive objects in the wireless power delivery environment. Although the example of FIG. 12A illustrates transmitting a beacon (or calibration) signal in the direction of the radiation and reception pattern 1210, it is appreciated that, in some embodiments, beacon signals can alternatively or additionally be omni-directionally transmitted.

Figure 13:
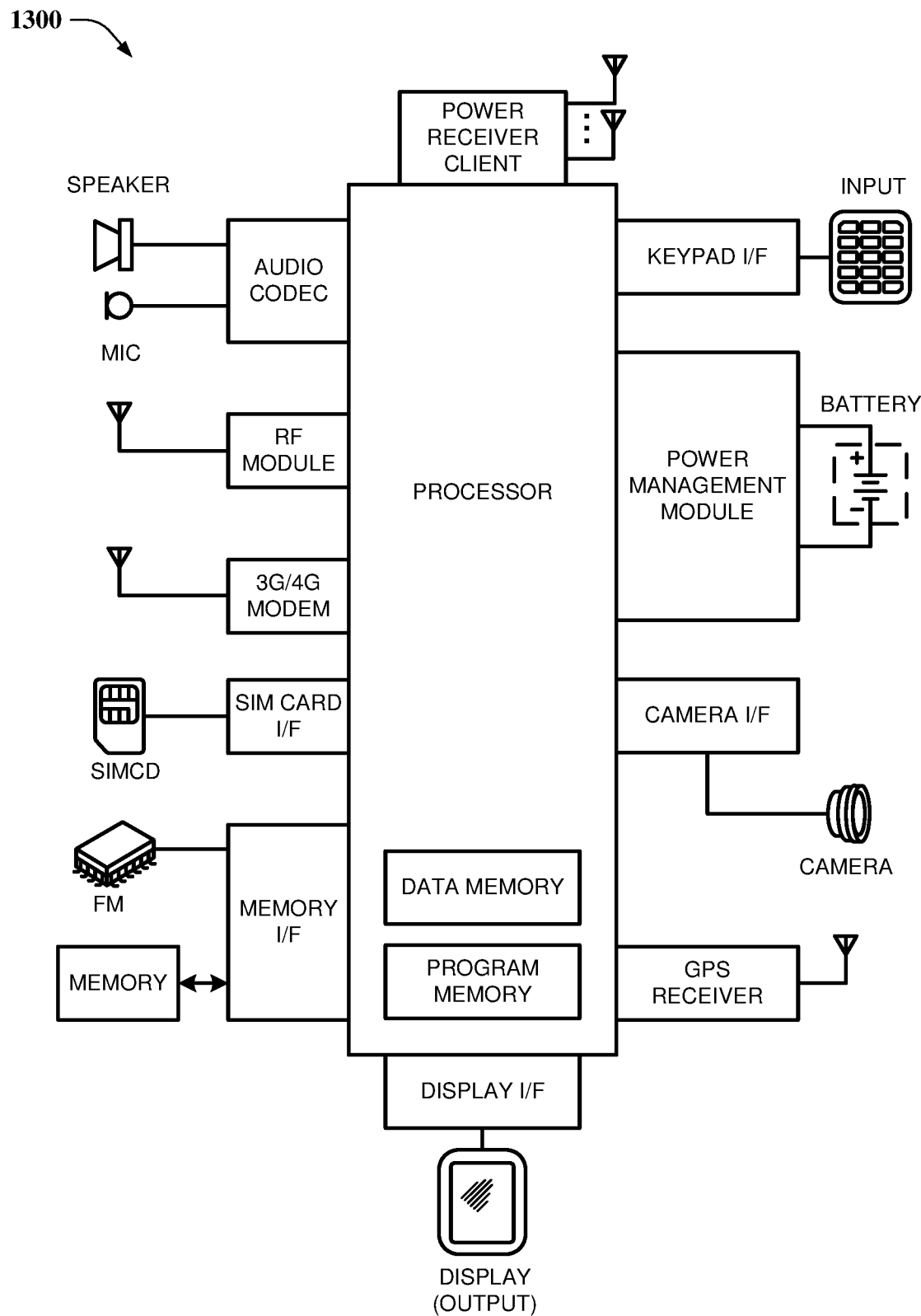
FIG. 13 depicts a block diagram illustrating example components of a representative mobile device or tablet computer with a wireless power receiver or client in the form of a mobile (or smart) phone or tablet computer device, in accordance with various example embodiments.

FIG. 13 depicts a block diagram illustrating example components of a representative mobile device or tablet computer 1300 with a wireless power receiver or client in the form of a mobile (or smart) phone or tablet computer device, according to an embodiment. Various interfaces and modules are shown with reference to FIG. 13, however, the mobile device or tablet computer does not require all of modules or functions for performing the functionality described herein. It is appreciated that, in many embodiments, various components are not included and/or necessary for operation of the category controller. For example, components such as GPS radios, cellular radios, and accelerometers may not be included in the controllers to reduce costs and/or complexity. Additionally, components such as ZigBee radios and RF identification (RFID) transceivers, along with antennas, can populate a PCB.

The wireless power receiver client can be a power receiver client 803 of FIG. 8, although alternative configurations are possible. Additionally, the wireless power receiver client can include one or more RF antennas for reception of power and/or data signals from a charger, e.g., WPTS 801a . . . 801n of FIG. 8.

Figure 14:
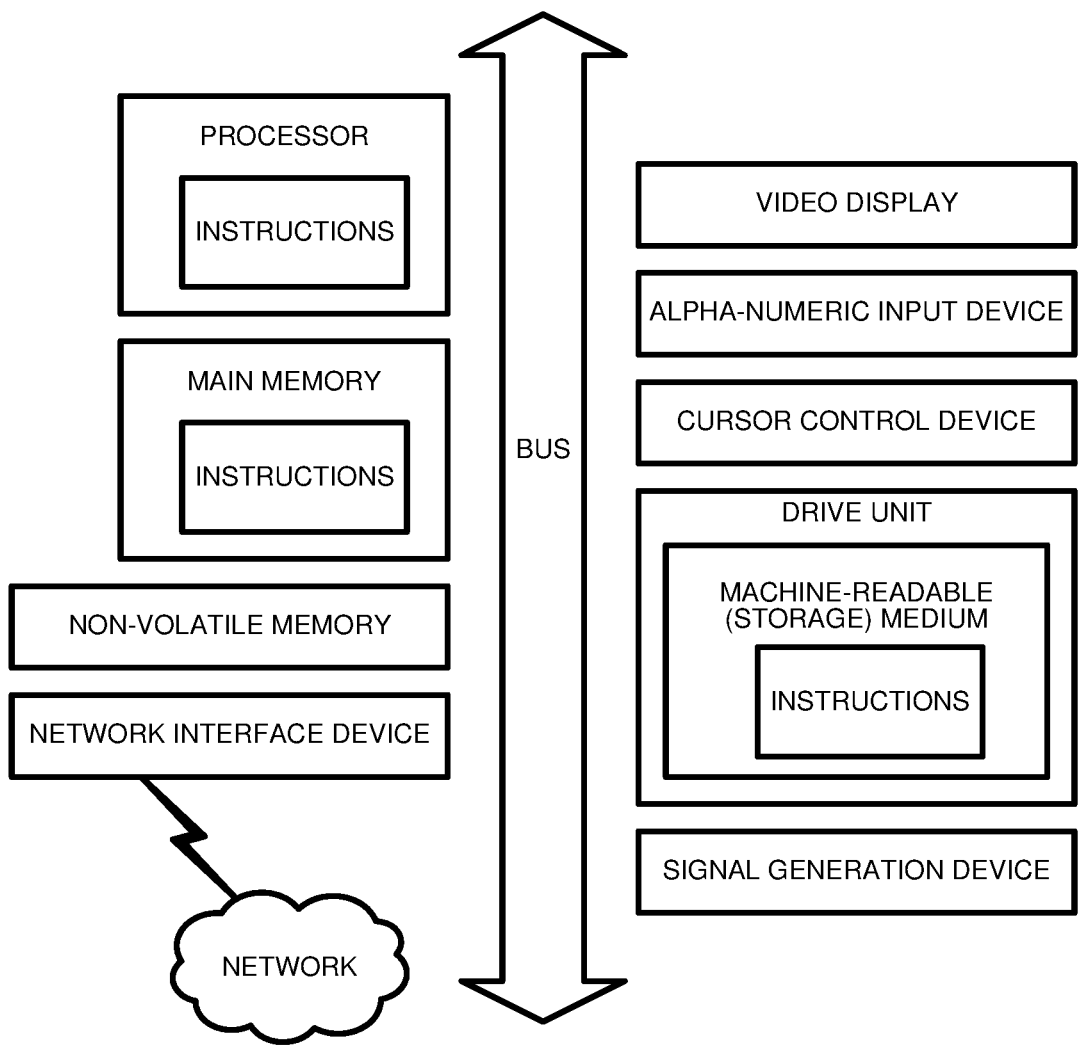
FIG. 14 depicts a diagrammatic representation of a machine, in an example form, of a computer system within which a set of instructions, for causing the machine to perform any one or more of the methodologies discussed herein, may be executed, in accordance with various example embodiments.

FIG. 14 depicts a diagrammatic representation of a machine, in the example form, of a computer system within which a set of instructions, for causing the machine to perform any one or more of the methodologies discussed herein, may be executed.

In the example of FIG. 14, the computer system includes a processor, memory, non-volatile memory, and an interface device. Various common components (e.g., cache memory) are omitted for illustrative simplicity. The computer system 1400 is intended to illustrate a hardware device on which any of the components depicted, e.g., in FIGS. 1-5, FIG. 9, etc. (and any other components described in this specification) can be implemented. For example, the computer system can be any radiating object or antenna array system. The computer system can be of any applicable known or convenient type. The components of the computer system can be coupled together via a bus or through some other known or convenient device.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a compact disk ROM (CD-ROM), electrically programmable ROM (EPROM), or electrically erasable ROM (EEPROM), a magnetic or optical card, or another form of storage for large amounts of data. Some of this data is often written, by a direct memory access process, into memory during execution of software in the computer 1400. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium". A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system. The interface can include an analog modem, an integrated services digital network (ISDN) modem, cable modem, token ring interface, satellite transmission interface (e.g. "direct PC"), or other interfaces for coupling a computer system to other computer systems. The interface can include one or more input and/or output (I/O) devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 14 reside in the interface.

In operation, the computer system 1400 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

As it employed in the subject specification, the term "processing component" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processing component can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions and/or processes described herein. A processing component can exploit nano-scale architectures such as, but not limited to, molecular and quantum-dot based transistors, switches and gates, in order to optimize space usage or enhance performance of components described herein. Further, a processing component can also be implemented as a combination of computing processing units.

In the subject specification, term "memory component" and substantially any other information storage component relevant to operation and functionality of a component and/or process described herein, refer to entities embodied in a "memory," or components comprising the memory. It will be appreciated that a memory component described herein can be either volatile memory or nonvolatile memory, or can include both volatile and nonvolatile memory.

By way of illustration, and not limitation, nonvolatile memory, for example, can be included in ROM, programmable ROM (PROM), EPROM, EPROM, or flash memory. Volatile memory can include RAM, which acts as external cache memory. By way of illustration and not limitation, RAM is available in many forms such as SRAM, DRAM, synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Aspects of systems, apparatus, and processes explained herein can constitute machine-executable instructions embodied within a machine, e.g., embodied in a computer readable medium (or media) associated with the machine. Such instructions, when executed by the machine, can cause the machine to perform the operations described. Additionally, systems, processes, process blocks, etc. can be embodied within hardware, such as an application specific integrated circuit (ASIC) or the like. Moreover, the order in which some or all of the process blocks appear in each process should not be deemed limiting. Rather, it should be understood by a person of ordinary skill in the art having the benefit of the instant disclosure that some of the process blocks can be executed in a variety of orders not illustrated.

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Further, the word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art having the benefit of the instant disclosure.

Furthermore, to the extent that the terms "includes," "has," "contains," and other similar words are used in either the detailed description or the appended claims, such terms are intended to be inclusive—in a manner similar to the term "comprising" as an open transition word—without precluding any additional or other elements. Moreover, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the terms "connected," "coupled," or any variant thereof, means any connection or coupling, either direct or indirect, between two or more elements; the coupling of connection between the elements can be physical, logical, or a combination thereof. Where context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are, at times, shown as being performed in a series, these processes or blocks may instead be performed in parallel, or may be performed at different times. Further, any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A wireless power delivery system, comprising:
   an array of antenna elements positioned on a surface of a substrate, wherein a first antenna element of the array of antenna elements transmits first power at a first frequency and a second antenna element of the array of antenna elements transmits second power at a second frequency, different than the first frequency; and
   an antenna management component that:
      receives, via the array of antenna elements, respective portions of a wireless beacon signal that has been transmitted by a wireless charging device,
      determines characteristics of the respective portions of the wireless beacon signal measured by respective antenna elements of the array of antenna elements, the characteristics comprising complex conjugates of the wireless beacon signal,
      based on the characteristics of the respective portions of the wireless beacon signal measured by the respective antenna elements of the array of antenna elements, determines a change in condition has manifested according to a defined change criterion that triggers an analysis of whether to switch at least one of the first antenna element or the second antenna element on or off to change a frequency emitted by the wireless power delivery system to the wireless charging device, resulting in a modified frequency, and
      in response to determining that at least one of the first antenna element or the second antenna element is to switch on or off, switches on or off the at least one of the first antenna element or the second antenna element and delivers power according to the modified frequency, as a result of which a charging performance of the wireless charging device is increased, wherein the analysis comprises the analysis of a predicted movement of a receiving element of the wireless charging device.

2. The wireless power delivery system of claim 1, wherein the analysis comprises receiving feedback from the wireless charging device relating to the charging performance experienced by the wireless charging device when receiving the first power according to the first frequency relative to when receiving the second power according to the second frequency.

3. The wireless power delivery system of claim 1, wherein the analysis comprises receiving feedback from the wireless charging device relating to respective strengths of the first power and the second power received by the wireless charging device.

4. The wireless power delivery system of claim 1, wherein the analysis comprises receiving feedback from the wireless charging device relating to respective reliabilities of the first power and the second power received by the wireless charging device.

5. The wireless power delivery system of claim 1, wherein the analysis comprises receiving feedback from the wireless charging device relating to respective constructive interferences that have been measured based on the first power and the second power received by the wireless charging device.

6. The wireless power delivery system of claim 1, wherein the analysis comprises the analysis of historical feedback previously received about which of at least one of the first frequency or the second frequency is likely to best deliver the power for the change in the condition.

7. The wireless power delivery system of claim 1, wherein the analysis comprises the analysis of present feedback from the wireless charging device about how well the wireless charging device is currently receiving at least one of the first power according to the first frequency or the second power according to the second frequency.

8. The wireless power delivery system of claim 1, wherein the predictive movement analysis comprises the analysis of the predicted movement of the receiving element of the wireless charging device with respect to a defined location of a building.

9. A wireless power delivery system, comprising:
   an array of antenna elements positioned on a surface of a substrate, wherein a first antenna element of the array of antenna elements transmits first power within a first frequency range and a second antenna element of the array of antenna elements transmits second power within a second frequency range; and
   an antenna management component that:
      receives, via the array of antenna elements, respective portions of a wireless calibration signal that has been transmitted by a wireless charging device,
      based on characteristics that comprise complex conjugates of the wireless calibration signal, the characteristics corresponding to the respective portions of the wireless signal measured by respective antenna elements of the array of antenna elements, determines, according to a defined change criterion, that a condition of an environment in which the wireless power delivery system and the wireless charging device are situated has changed, thereby initiating an analysis of whether to change at least one of a first operating frequency in the first frequency range of the first antenna element to a modified first operating frequency within the first frequency range or a second operating frequency in the second frequency range of the second antenna element to a modified second operating frequency within the second frequency range, and
      in response to determining that the at least one of the first operating frequency or the second operating frequency is to change, changes the at least one of the first operating frequency or the second operating frequency to deliver power according to the at least one of the modified first operating frequency or the modified second operating frequency, as a result of which a charging performance the wireless charging device is increased, wherein the analysis comprises the analysis of a predicted movement of a receiving element of the wireless charging device.

10. The wireless power delivery system of claim 9, wherein the at least one of the first frequency range or the second frequency range comprises an ultra wide band range of frequencies.

11. The wireless power delivery system of claim 10, wherein the wireless charging device is configured to receive the power according to the ultra wide band range of frequencies.

12. The wireless power delivery system of claim 9, wherein the first frequency range and the second frequency range are a same frequency range.

13. A method, comprising:
   receiving, by a system comprising a processor via at least one antenna element of an array of antenna elements that has been formed on a substrate, feedback from a wireless charging client relating to a charging performance of a power charging experience occurring at the wireless charging client as a result of at least one of a first frequency of first power emitted by a first antenna element of the array of antenna elements or a second frequency of second power emitted by a second antenna element of the array of antenna elements, wherein the first frequency is different from the second frequency, and wherein the receiving of the feedback comprises receiving a wireless beacon signal that has been transmitted by the wireless charging client and determining complex conjugates of the wireless beacon signal;

based on the feedback and the wireless beacon signal, determining, by the system, to switch, on or off, emission of at least one of the first power at the first frequency or emission of the second power at the second frequency, the determining comprising initiating an analysis of a predicted movement of a receiving element of the wireless charging client; and based on a result of the determining, switching, by the system on or off, the emission of the at least one of the first power at the first frequency or the emission of the second power at the second frequency, as a result of which the charging performance of the wireless charging client is increased.

14. A method, comprising:

receiving, by a system comprising a processor via at least one antenna element of an array of antenna elements that has been formed on a substrate, feedback from a wireless charging client relating to a quality of a power charging experience occurring at the wireless charging client as a result of at least one of a first frequency of first power emitted within a first operable frequency range by a first antenna element of the array of antenna elements or a second frequency of second power emitted within a second operable frequency range by a second antenna element of the array of antenna elements, wherein the receiving of the feedback comprises receiving a wireless calibration signal that has been transmitted by the wireless charging client;

based on a result of analyzing the feedback, the analyzing comprising determining complex conjugates of the wireless calibration signal, changing emission of at least one of the first power at the first frequency or emission of the second power at the second frequency to at least one of emission of modified first power at a modified first frequency with the first operable frequency range or modified second power at a modified second frequency with the second operable frequency range, wherein the analyzing further comprises an analysis of a predicted movement of a receiving element of the wireless charging device; and in response to the changing, determining that the quality of the power charging experience of the wireless charging device has increased.

15. The method of claim 14, further comprising, in response to the determining that the quality of the power charging experience of the wireless charging device has increased, ceasing the analyzing of the feedback until a change in condition according to a condition change criterion is satisfied.

16. The method of claim 14, wherein the second frequency range is different from the first frequency range.

17. The method of claim 14, wherein the first frequency range and the second frequency range are a same frequency range.

18. A method, comprising:

receiving, by a system comprising a processor via at least one antenna element of an array of antenna elements that has been formed on a substrate, feedback from a wireless charging client relating to a quality of a power charging experience occurring at the wireless charging client as a result of at least one of a first frequency of first power emitted at a first frequency by a first antenna element of the array of antenna elements, a second frequency of second power emitted individually by a group of second antenna elements of the array of antenna elements, or a third frequency of third power emitted together by the group of second antenna elements at an effective frequency that is different than the second frequency, wherein the receiving of the feedback comprises receiving a wireless beacon signal that has been transmitted by the wireless charging client;

based on a result of analyzing the feedback, the analyzing comprising determining complex conjugates of the wireless beacon signal, switching from a current emission at a current frequency to at least one of emission of at least one of the first power at the first frequency, emission of the second power at the second frequency, or emission of the third power at the third frequency, wherein the analyzing further comprises initiating an analysis of a predicted movement of a receiving element of the wireless charging device; and in response to the switching, determining that the quality of the power charging experience of the wireless charging device has increased.

19. The method of claim 18, wherein the effective frequency of the third frequency is at or about the first frequency.

20. The method of claim 19, wherein the first frequency and the second frequency are different frequencies.

* * * * *